Oct. 28, 1930.  E. J. RAY  1,779,510
MACHINE FOR INSERTING FASTENINGS
Filed Aug. 29, 1924  12 Sheets-Sheet 1

INVENTOR
Eugene J. Ray

Oct. 28, 1930.  E. J. RAY  1,779,510
MACHINE FOR INSERTING FASTENINGS
Filed Aug. 29, 1924  12 Sheets-Sheet 6

INVENTOR
Eugene J. Ray

Oct. 28, 1930. E. J. RAY 1,779,510
MACHINE FOR INSERTING FASTENINGS
Filed Aug. 29, 1924 12 Sheets-Sheet 9
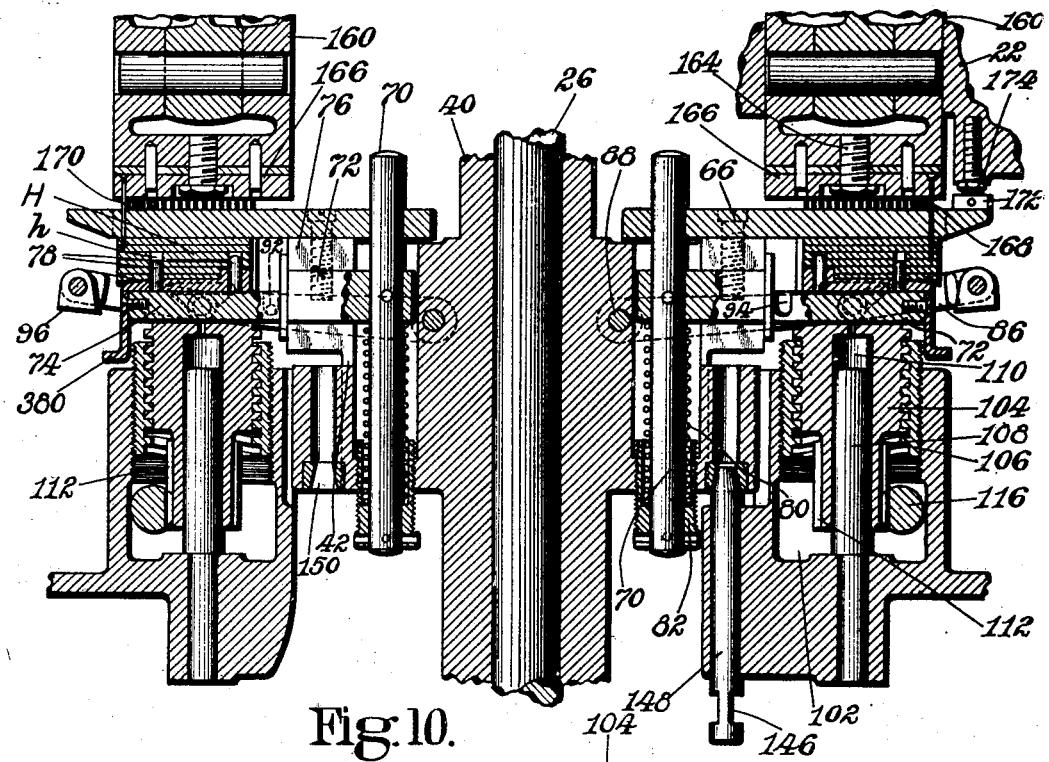
Fig. 10.
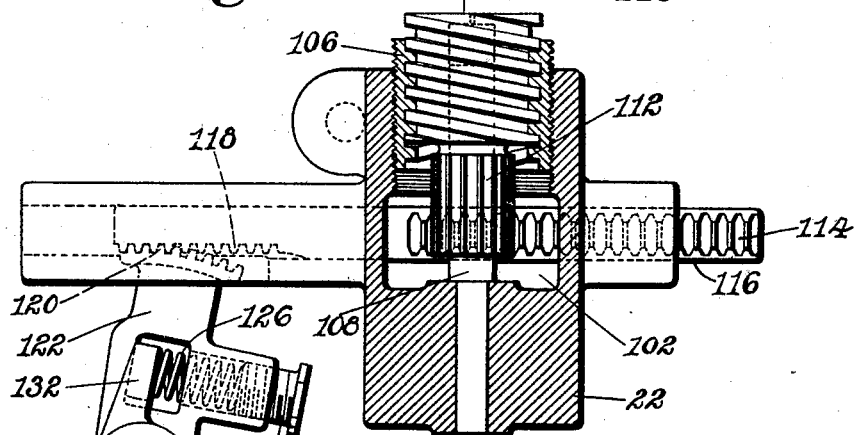
Fig. 11.
INVENTOR

INVENTOR
Eugene J. Ray

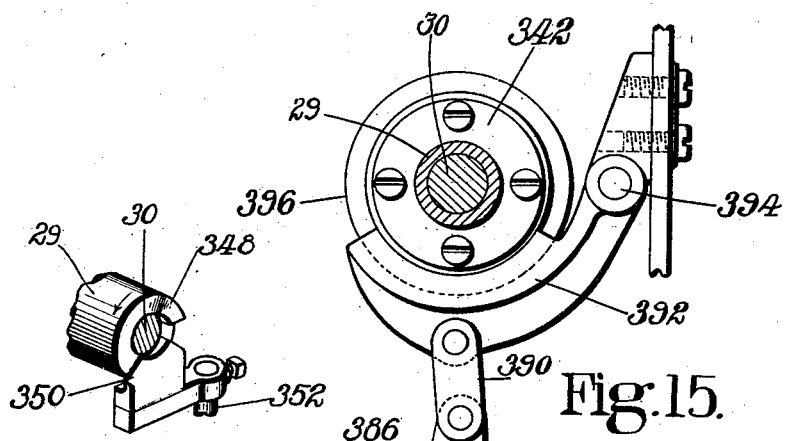
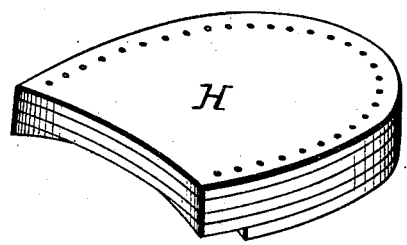
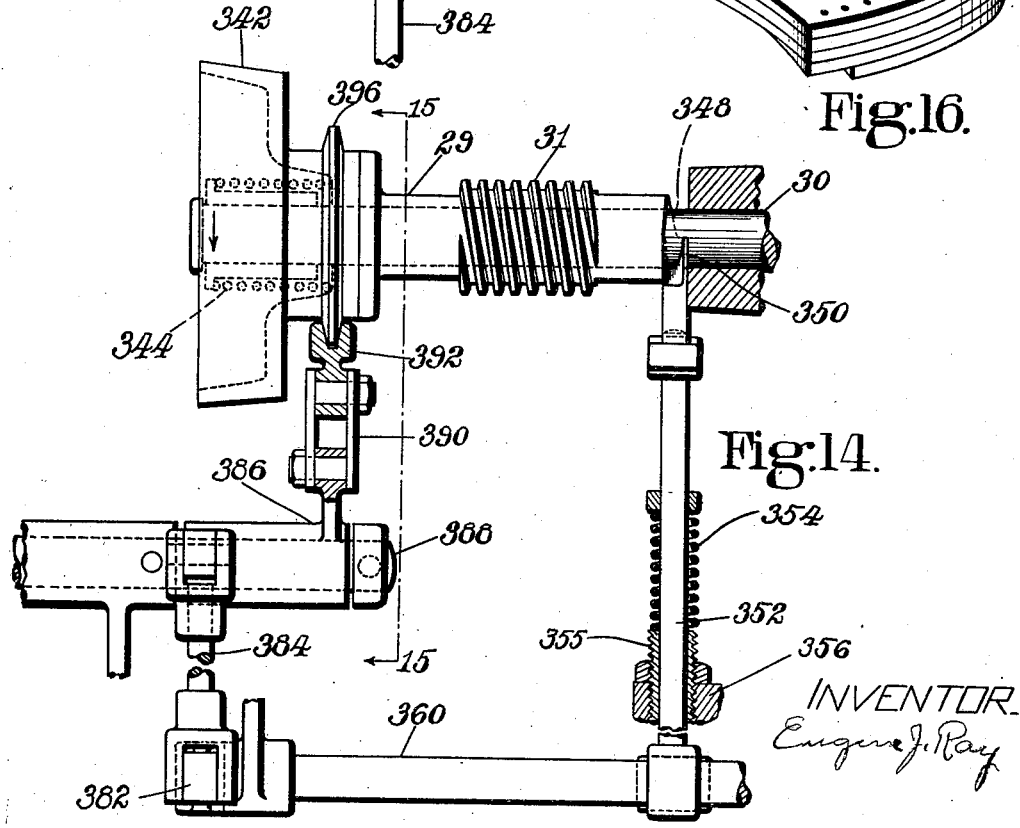

Patented Oct. 28, 1930

1,779,510

UNITED STATES PATENT OFFICE

EUGENE J. RAY, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR INSERTING FASTENINGS

Application filed August 29, 1924. Serial No. 734,931.

My invention relates to machines for inserting fastenings, and is illustrated as embodied in a machine for driving simultaneously a plurality of slugs in heels prior to their attachment to shoes.

This invention has as an object the provision of such an apparatus by which the fastenings are applied rapidly, easily and accurately, without requiring skilled attendance, and by which injury to the operator is guarded against.

In the attainment of this object, in accordance with features of the invention, the heels are supported upon a conveyor, such as a turret, having a plurality of clamping devices, by which the heels are successively and automatically presented at positions at which there are various operating mechanisms. At these positions or stations, the heels may, for example, be supplied to the clamping devices or other supports, pricked to facilitate the entrance of the fastenings, supplied with series or loads of the fastenings ready for insertion, and these fastenings driven simultaneously into the pricked openings. After the performance of these operations, a member, preferably fixed relatively to the turret, acts to eject the heels. At certain of the positions where a downward pressure is exerted upon the work, as those at which the pricking and driving operations are performed, the pressure of the operating mechanisms upon the clamping devices is preferably resisted, as by abutments movable into cooperation with clamping members, which are normally only spring-pressed toward their companion clamping members. The latter, which are uppermost, may be in the form of templets having openings arranged in accordance with the slugging or other design, the various operations taking place through these openings. The correct presentation of the heels to the operating mechanisms is assured by positioning surfaces upon the work-support, as the turret or conveyor, which surfaces co-operate with corresponding surfaces formed within the peripheries of the heels. As herein illustrated, these positioning surfaces of the machine are shown as pins or projections from one of the opposite sections of each clamping device, preferably the lower section, upon which the heels are supported. To facilitate the ejection of the work, especially in view of its engagement by the positioning projections, I furnish a supporting member in addition to the lower clamping section. When a heel is released by its clamp, this support may be moved into engagement with said heel to separate it from the positioning projections ready to receive the action of the ejecting member.

The mechanism which supplies the fastenings acts, as another feature of the invention, to produce successive groups of fastenings, preferably from wire having the same cross-section as that of the fastenings, and then assembles these groups in definite relation, to form a complete load ready for delivery to the inserting mechanism. The groups may consist of pairs of fastenings, the elements of each pair going to opposite sides of the heels. In this way, fastenings of different lengths, as long slugs at the breast-corners and shorter slugs elsewhere about the heels, may be symmetrically located. I provide means for varying the relative lengths of the fastenings at will, as by a series of cams, any one of which may be brought into operative relation to the mechanism for feeding the wires. The groups of fastenings may be severed by cutters from wires thus fed, and delivered to a movable distributing member, at which they are temporarily retained by a shutter. At the appropriate time in the movement of the member, they are released for delivery to the templet of a heel-clamp.

As a further feature of the invention, the operation of the machine is placed, through novel means, under the control of the conveyor which advances the work from a receiving station for the operations upon it. This control is exercised by a disconnection of the driving mechanism of the machine, as by disengaging a clutch joining a motor to the driving shaft, and also, if desired, by the application of brake mechanism to stop the operation of the machine promptly. At herein illustrated, direct control of the clutch is through means which normally acts to disengage it, but which may be latched to prevent action, this latch being preferably released by a member movable by the conveyor to bring about the disengagement of the clutch. By this means, the operation of the machine may be stopped periodically and at such times as injury might be caused to the operator by continuance of movement. If, however, the operator has so acted, as by completing the application of a heel or other work-piece to the clamp which is to support it, that the machine may safely continue in action, he may modify the control of the clutch by the conveyor. For this purpose, I provide a member, for engagement by the operator, which will so retain the disengaging means that it remains in co-operation with the latch, allowing this to become effective and the machine to continue in operation until the next point of automatic control is reached. Here again the operator may nullify the disconnecting action, so the machine will function continuously as long as the operator correctly times the application of heels to the clamps.

Other features of the invention will be hereinafter developed.

Of the many embodiments which my invention may assume, one only is illustrated in the accompanying drawings. Here, Fig. 1 is a top plan view of my improved machine, parts being broken away;

Fig. 2 a broken front elevation of the upper portion of the machine;

Fig. 3 a corresponding view of the lower portion;

Figure 6:
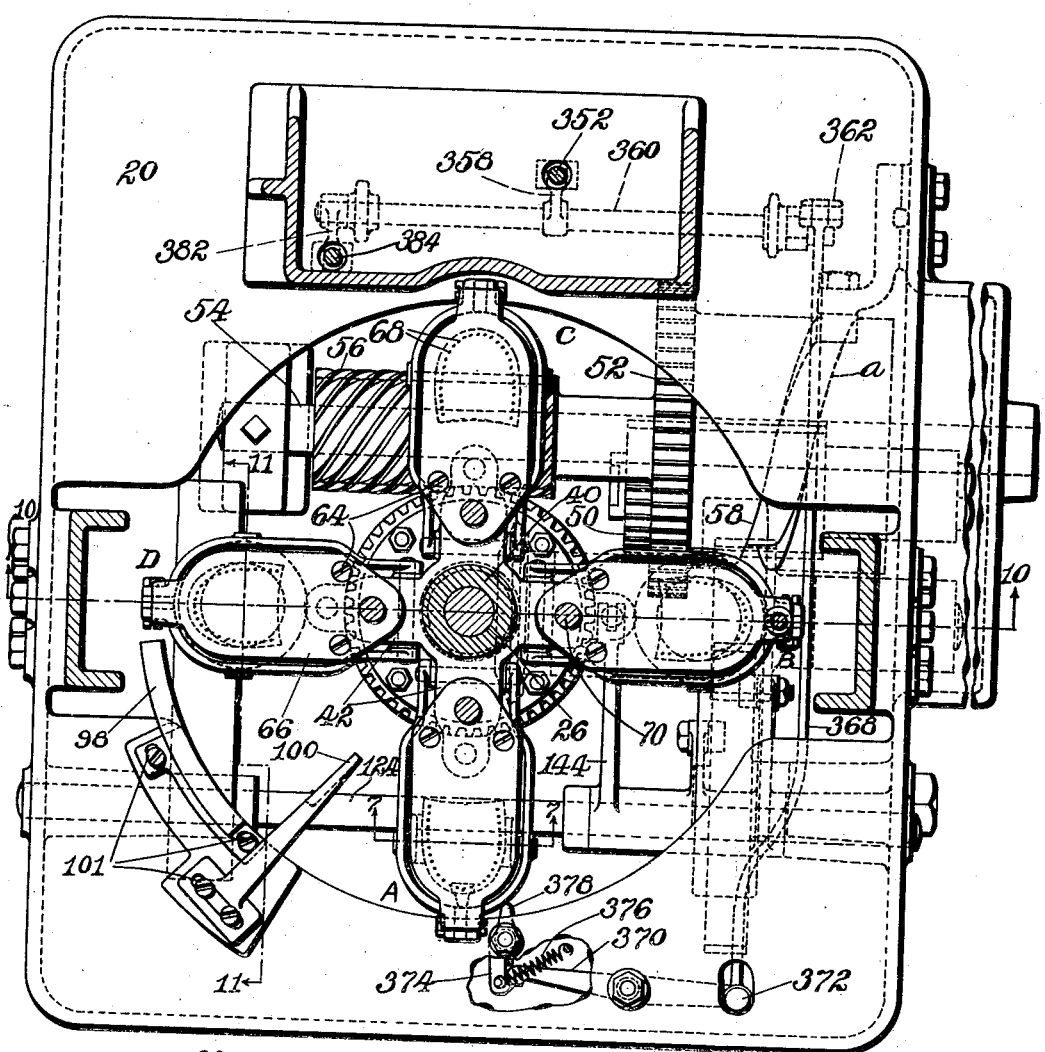
Fig. 6 is a horizontal section on the line 6—6 of Fig. 2.
Figure 7:
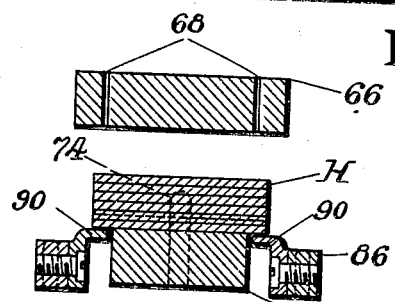
Figure 8:
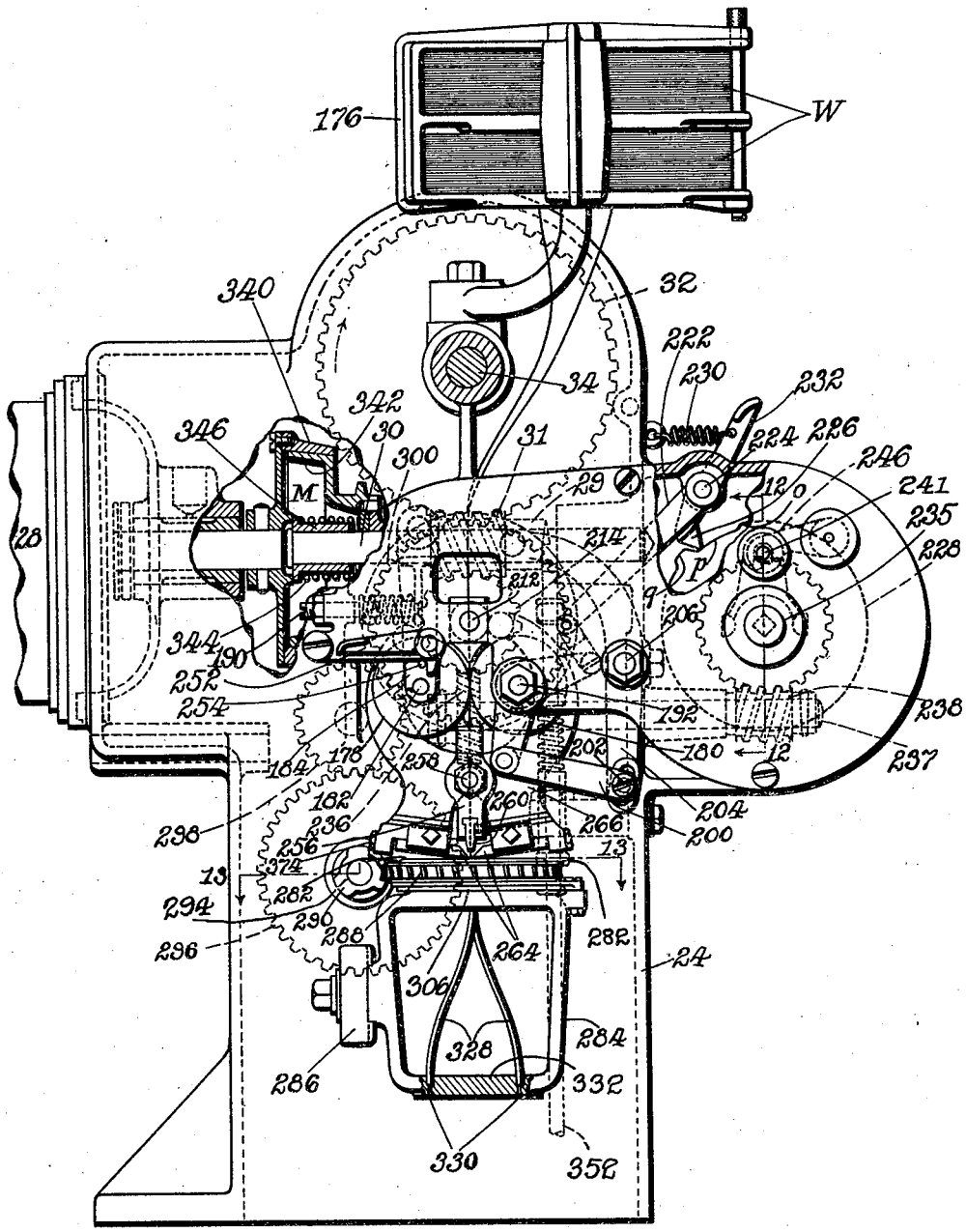
Figure 9:
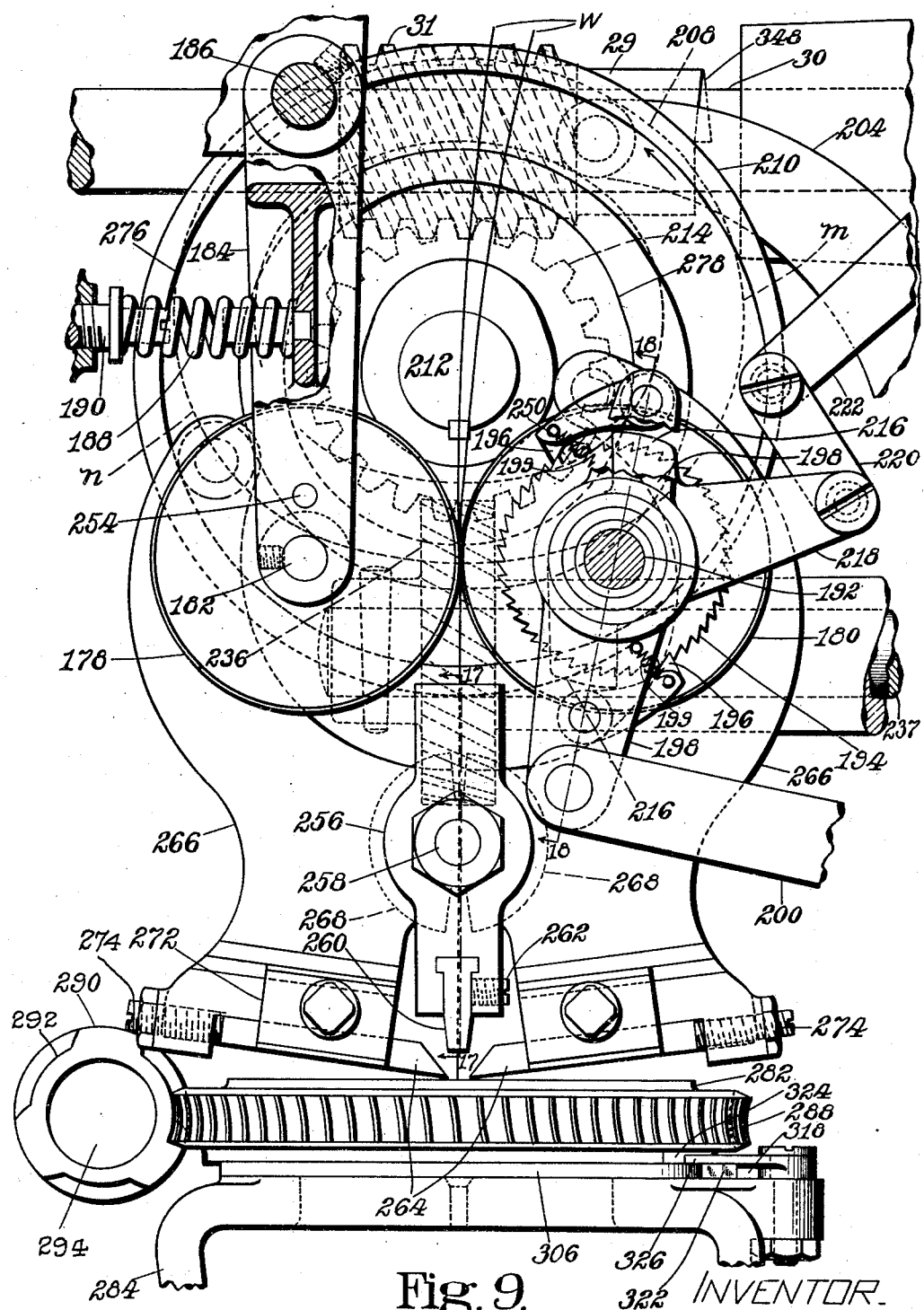
Figure 12:
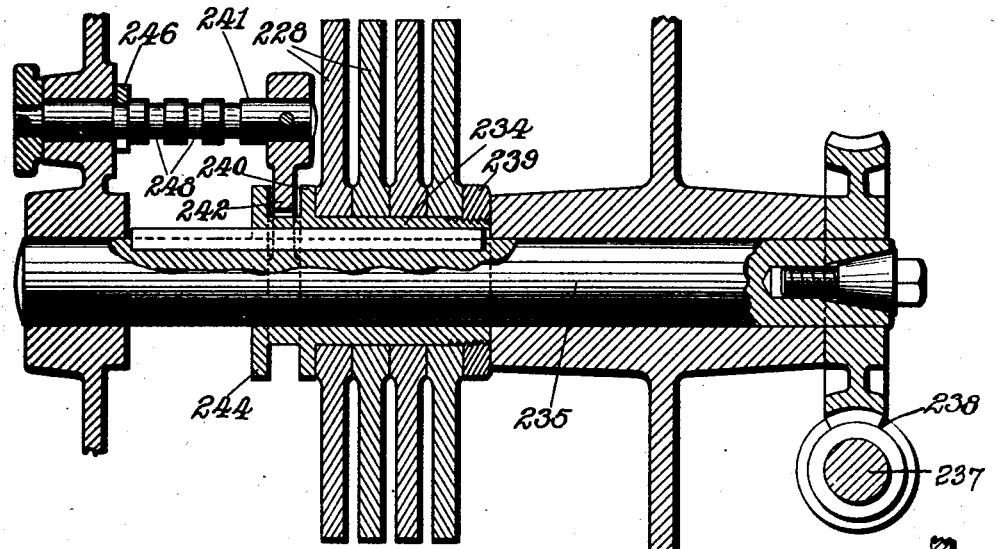
Figure 13:
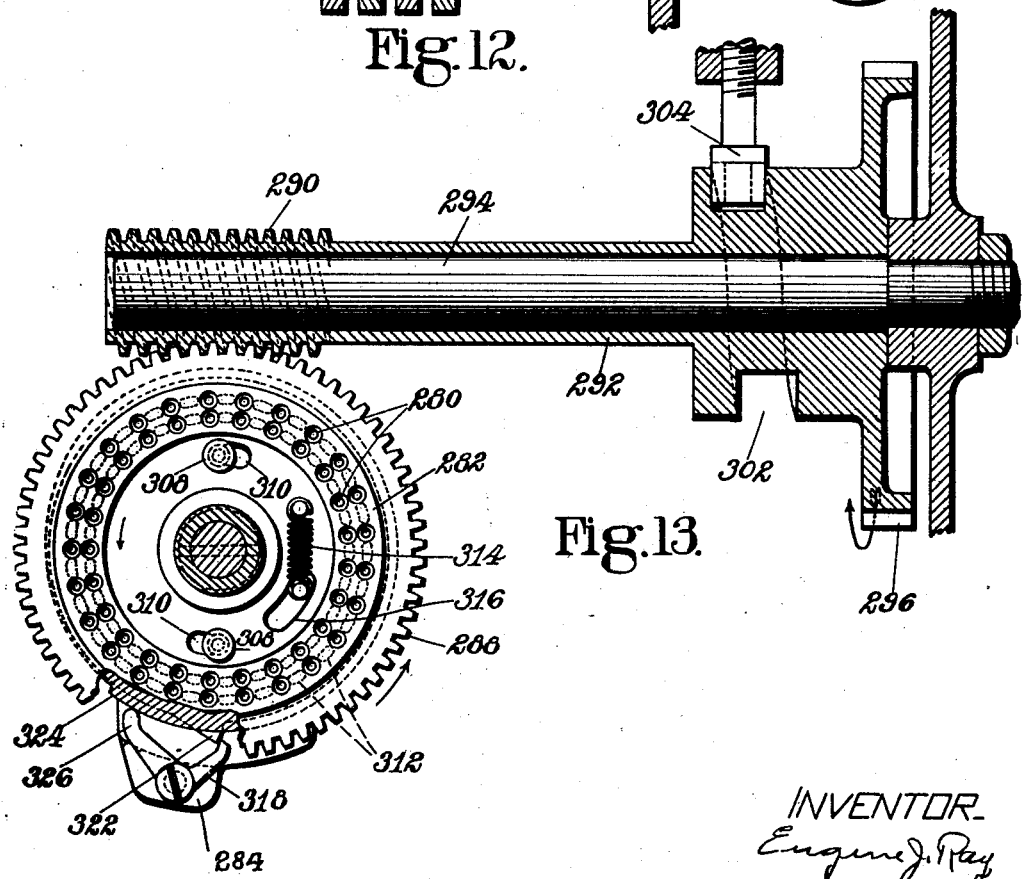
Figure 18:
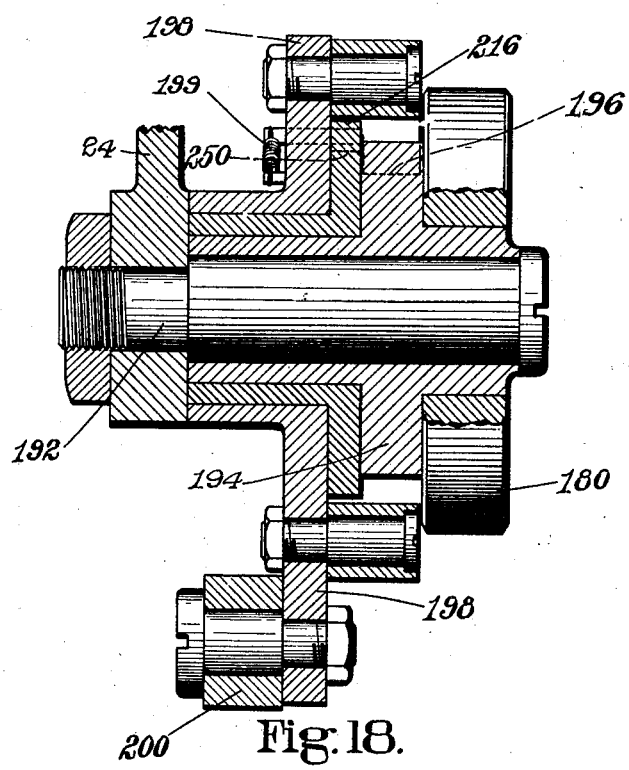
Figure 17:
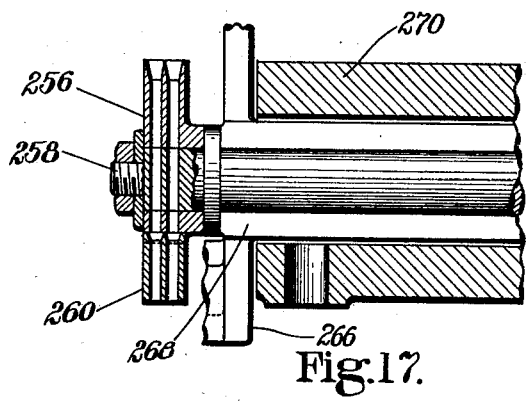

Fig. 7, a vertical section on the line 7—7 of Fig. 6;

Fig. 8, a front elevation of the upper portion of the slug-making and distributing mechanism;

Fig. 9, an enlarged, broken front elevation of the wire-feeding, cutting and slug-receiving instrumentalities;

Fig. 10, an enlarged, vertical sectional detail on the line 10—10 of Fig. 6;

Fig. 11, a similar view on the line 11—11 of Fig. 6;

Fig. 12, a sectional detail on the line 12—12 of Fig. 8;

Fig. 13, a like view on the line 13—13 of Fig. 8;

Fig. 14, an enlarged detail, in elevation, of the clutch-actuating and braking mechanism;

Fig. 15, a transverse section on the line 15—15 of Fig. 14;

Fig. 16, a perspective view of a heel supplied with slugs by the present invention;

Figs. 17 and 18, sectional details on the lines 17—17 and 18—18 of Fig. 9; and

Fig. 19, a perspective view of a portion of the clutch-releasing mechanism.

Figure 1:
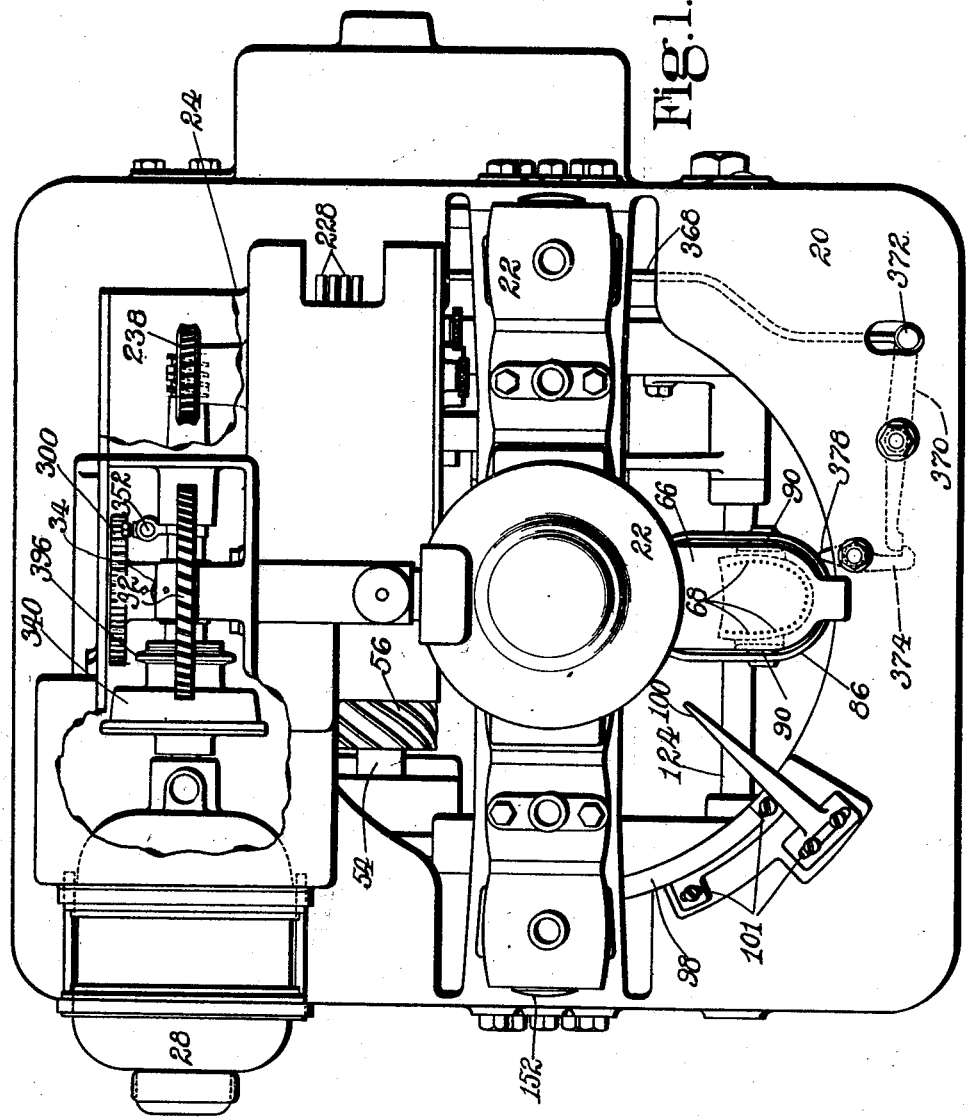
Figure 2:
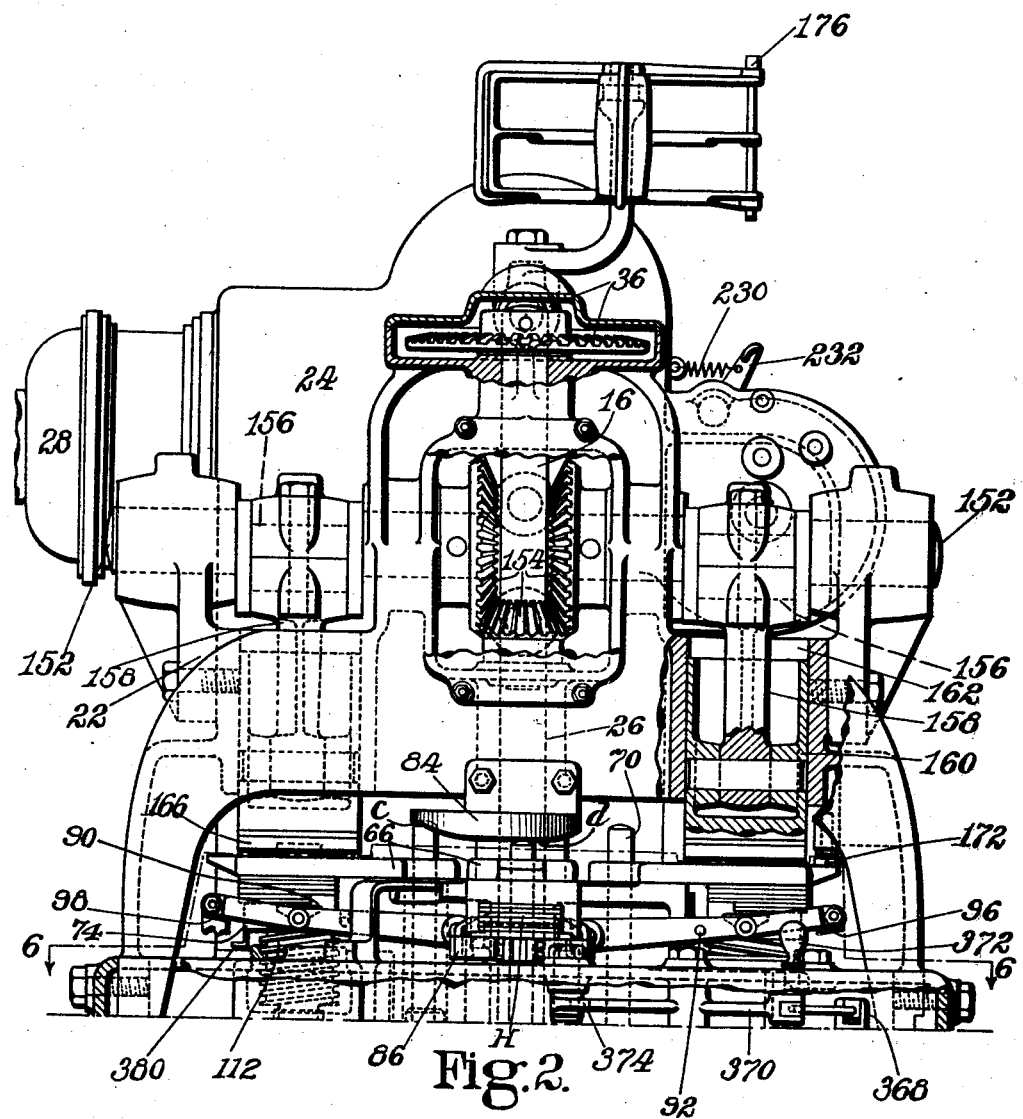
Figure 3:
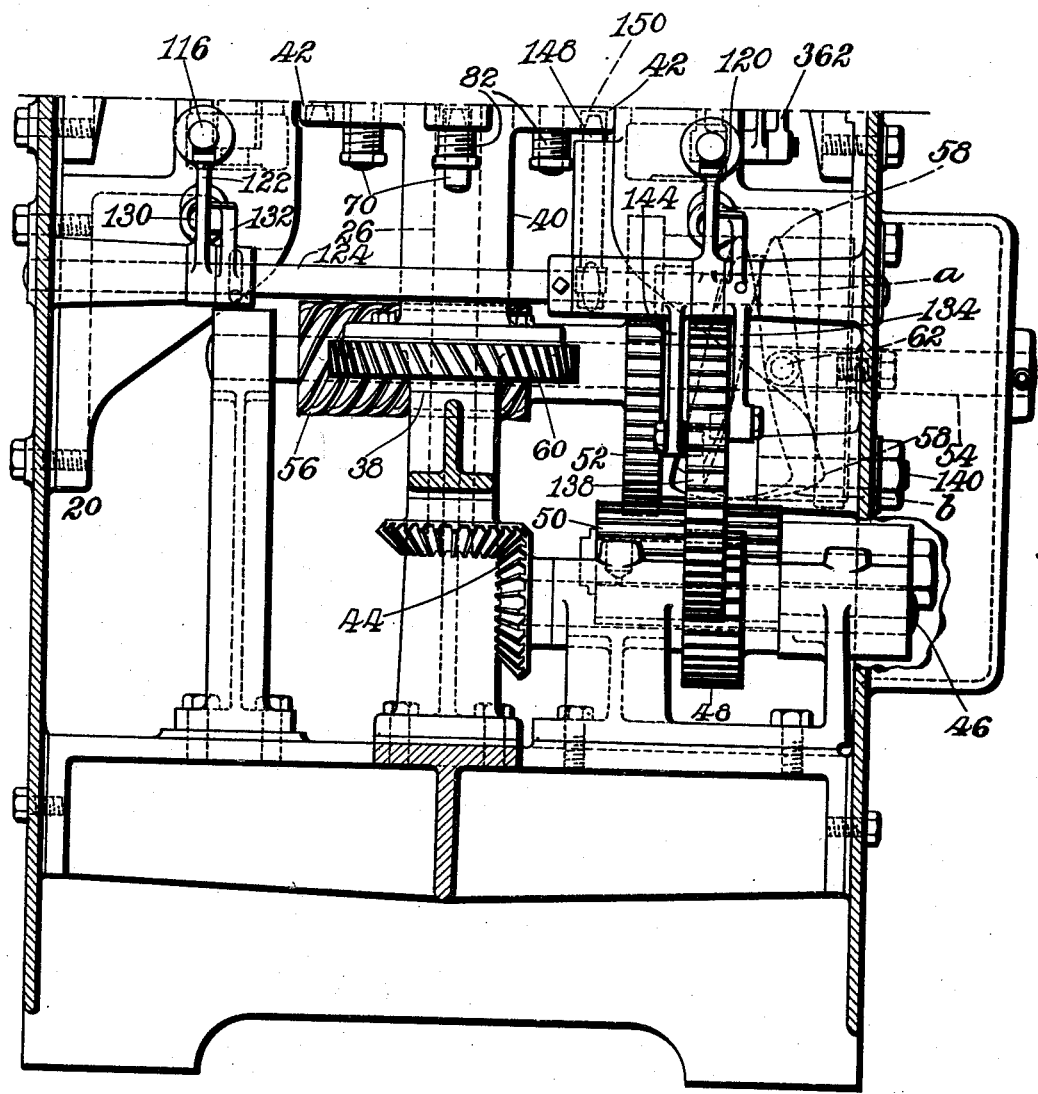

From a base 20 rise forward and rear standards or frame-portions 22 and 24, respectively. Journaled in the front standard is a vertical driving shaft 26 (Fig. 2) actuated from a motor 28, preferably electric, mounted at one side of the frame-portion 24. The motor is connected through clutch mechanism M, see Fig. 8 of the drawings, to a tubular shaft or sleeve 29 surrounding a horizontal spindle 30 extending transversely of the frame-section 24. Formed upon this sleeve is a worm 31 (Fig. 4) meshing with a worm-gear 32 fixed upon a horizontal shaft 34 rotatable in the upper part of the frame-portion 24 and joined through reduction bevel-gearing 36 to the machine-shaft 26. This vertical shaft is driven, while the clutch mechanism is in engagement, continuously at a much slower speed than the motor. Surrounding the shaft 26 and stepped at 38 upon the base (Fig. 3) is a sleeve 40, having projecting horizontally from it, and separated from one another by angles of 90 degrees, four arms 42 (Figs. 6 and 10) furnishing a turret or work-conveyor. They are arranged to present the work-pieces simultaneously at four operating stations A, B, C and D, and to successively move the pieces through such stations, stopping at each a sufficient time to permit the performance of all four operations upon the work. Of these, A is the entering station, at which the heels or other work-pieces are supplied; at B the heels may be pricked, to prepare them for the insertion of the slugs or other fastenings; at C, slugs are formed, arranged and delivered to the thus-formed openings; and at D, such slugs are driven into place. Between stations D and A, the completed work-pieces are ejected. To rotate and stop the turret in the correct time-relation, the shaft 26 drives, through bevel-gearing 44 (Fig. 3), a horizontal shaft 46 rotatable in the base. Secured upon the shaft 46 is a pinion 48 meshing with an elongated gear 50, journaled upon a stub-shaft projecting from one side of the base, the gear 50 meshing, in turn, with a gear 52. This gear 52 turns about a horizontal spindle 54 extending transversely of the base, and has, arranged to rotate with it, an elongated worm 56 and a cam 58. Fast upon the sleeve 40 is a worm-wheel 60 rotated by the worm 56. Projecting from the inner wall of the base, and having an anti-friction roll surrounding it, is a pin 62 entering the groove of the cam 58. The cam-groove has a portion $a$, of the same pitch as that of the worm 56, and a steeper portion $b$, of less angular extent than the portion $a$. As the worm 56 is rotated from the shaft 26, it is also moved longitudinally upon the spindle 54 by the action of the cam-groove. While the portion $a$ of this groove is effective, the worm 56 moves bodily at the same rate it turns, so it at this time does not act upon the wheel 60, and the turret remains at rest. When, however, the pin is within the portion $b$ of the groove, the longitudinal movement of the worm 56 is accelerated, and it becomes effective to rotate the wheel 60. During this period, each turret-arm is carried from one station to the next.

Fixed across the top of each turret-arm by screws 64 is a templet or abutment-plate 66 (Figs. 6 and 10) perforated at 68 in accordance with the slugging design, or arrangement which the inserted fastenings are to have. These plates are made separable from the turret, so that others bearing different designs may be substituted. Sliding in an opening in each templet, and in a vertically alined opening in the turret-arm beneath it, is a vertical spindle 70 having fixed to it the enlarged carrier-portion 72 of a work-supporting and pressure-plate 74, which extends beneath and parallel to the templet, and forms with it a work-clamp. The supporting plate 74 is movable vertically, guided by the spindle 70 and by walls 76, 76 upon the turret-arms, with which walls contact opposite sides of the carrier-portion 72. Rising from each work-supporting plate are spaced work-positioning projections, here shown in the form of two vertical jig-pins 78. In the present instance, these are arranged to enter openings $h$ formed within the peripheries of the heels H to be slugged, and locate these correctly with relation to the various instrumentalities which are to operate upon them. Encircling each spindle 70 is a helical spring 80 located between the portion 72 of the supporting plate and a thimble 82 threaded into the lower portion of the turret-arm. This spring holds the plate 74 normally elevated in its clamping relation to the companion templet. The force with which the spring acts may be regulated by varying the position of the thimble. To lower the supporting plate, so that a heel may be introduced between it and the templet and removed therefrom, the frame-portion 22 carries a cam member 84 (Fig. 2), along which the upper, rounded extremities of the spindles 70 travel in the rotation of the turret. This cam member has an elevated portion $c$, which, while the spindles are beneath it, permits them to be raised by the springs 80 until the plates 74 are urged toward the templets, to clamp applied work-pieces. A portion $d$ of the cam member 84 forces down the spindles as they come successively beneath it, lowering the plates 74 to free the supported piece for ejection and to hold the plates thus separated to receive a fresh piece. The extent of the cam-portions $c$ and $d$ is such that the clamping relation is maintained through stations B, C and D, and the supporting plate lowered as the clamp approaches station A, this action being continued until after the clamp has traveled out of this station.

To remove from a support a heel which has passed through the various stations and been subjected to all the operations, there is associated with each clamp a device for raising the heel from the pins 78, while located between stations D and A is a device for ejecting the heel from the clamp. The former device is furnished by a yoke 86 pivoted at 88 upon the turret and having at each side of the plate 74 a horizontally extending lifting and supporting finger 90 (Fig. 7), which lies just beneath the edge of the heel overhanging the support. The yokes may be maintained by gravity in a normally lowered position, their downward travel being limited by pins 92, 92 which enter recesses 94, 94 in the opposite sides of the plate 74. Pivoted upon the outer extremity of each yoke is a contact member 96. After leaving station D, this member 96 rides over a cam-surface 98 (Fig. 6) secured to the top of the base, concentric to the axis of rotation of the turret. This cam-surface gradually rises as it approaches station A, and therefore, through the contact member 96, lifts the yoke to bring the fingers 90 against the under side of the heel and raise this from the plate 74 until the openings $h$ are clear of the pins 78. Thus supported, the heel is carried against an ejecting finger 100, which is secured to the base, extending toward the axis of the turret. This forces the heel from the fingers 90, and it falls into a receptacle, which may be placed in the base. Both the cam-surface 98 and the ejecting finger 100 are shown as retained in place by slot-and-screw connections 101, these allowing the times at which the secured members act to be varied.

At the pricking station B and the driving station D, a downward pressure is exerted upon the work, to which pressure it is desirable to oppose a resistance sufficient to withstand positively the working forces applied, in addition to the yielding support afforded by the springs 80. Mounted in a vertical depression 102 in the base at the pricking station, and similarly at the driving station, is a generally cylindrical ram or abutment member 104 (Figs. 10 and 11). This has upon its outer periphery a coarse thread engaging a corresponding thread in a surrounding sleeve 106 joined by a fine thread to a wall of the depression, so that the sleeve may be adjusted longitudinally of its axis. Each ram may be guided independently of the sleeve by a vertical spindle 108 mounted upon the base and extending into a bore 110 in the ram. Upon a depending portion of each of the rams are gear-teeth 112 meshing with rack-teeth 114 upon the side of a rod 116 sliding in the upper portion of the base. Formed at the under side of each rod is a rack 118 engaged by a gear-segment 120 at the upper extremity of an arm 122 loose upon a shaft 124 (Figs. 3 and 5) extending across the base. Between the shaft and segment, each arm has a lateral opening, into which projects a compression-spring 126 held in a bore in the arm and abutting at its outer end against a screw 128, by which the resistance of the spring may be altered. Contacting with the spring, within the opening of each arm, is the angular extremity 130 of an arm 132 fast upon the shaft 124. Fixed to the shaft, with one of the arms 122, is a depending arm 134. From the side of this arm 134, a projection enters a cam-groove 136 in the outer face of a cam-disk 138 journaled at 140 upon the base, and driven by teeth upon its periphery meshing with the pinion 48. As may be best seen in Fig. 5, the cam-groove 136 has a portion $e$ and a portion $f$ of greater radius than the portion $e$. When the projection from the arm 134 is within the portion $e$ of the cam-groove, this occurring at the time the turret is in rotation, the rams at both the pricking and driving stations are lowered by the lever and gearing connections, so the clamped heels may be introduced between said rams and the driving and pricking instrumentalities. But when two of the clamping devices in their travel come to rest above the rams, the portion $f$ of the cam-groove actuates the lever mechanism to so turn said rams that they are raised by their threaded portions, and are forced against the under sides of the supporting plates 74, thus resisting the downward thrust in the pricking and driving operations. Since this elevating action is transmitted through the springs 126, its extent may vary and the pressure applied limited, by virtue of the yield of the springs, to compensate for differences in the thickness of the work. By turning the externally threaded sleeves 106 within their depressions, they may be raised or lowered, to determine the limit of upward movement of the rams.

The opposite side of the disk 138 from the groove 136 carries an external cam 142. With this contacts, under the influence of a spring 143, a projection from one arm of a bell-crank-lever 144 turning about the shaft 124. A horizontally extending arm of this lever (Fig. 5) engages at 146 the recessed lower extremity of a locking pin 148 sliding vertically in the base 20 (Fig. 10). The tapered upper end of this pin enters any one of four uniformly spaced openings 150, which are formed in the respective turret-arms. With the projection of the lever contacting with a portion $g$ of the cam, the pin 148 is raised, and, the turret at this time being at rest, enters one of the openings 150, to lock the turret against rotation. After the operations at the four stations have been performed, a surface $h$ upon the cam engages the lever-projection, and the pin is lowered until, when the portion $i$ of the cam is effective, it is out of engagement with the openings 150, so the turret may be rotated. At the portion $k$ of the cam, the lever is abruptly released, this occurring at a time when one of the openings 150 is again alined with the pin 148, so that a lock is applied to the turret.

From the entering station A, the clamp, which has there been supplied with a heel, passes to the pricking station B. At the same time, an already-pricked heel travels from the slug-delivering station C to the driving station D. Since the operations at stations B and D are closely analogous and are performed by similar mechanisms, they will be considered together. Journaled horizontally across the upper portion of the frame member 22, at opposite sides of the shaft 26, are alined actuating shafts 152, 152 (Fig. 2) rotated from the shaft 26 through bevel-gearing 154. Included in these shafts 152 are crank-pins 156 joined by links 158 to plungers 160 operating in bores 162 in the standard. Upon the lower extremity of each plunger is secured, by a screw 164 (Fig. 10), a holder-plate 166. The holder-plate at station B is equipped with awls 168, and that at station D with drivers 170, these in each case being of any suitable form. When the turret is locked by the pin 148, the openings 68 in the templets, which correspond in arrangement to the design of the awls and drivers in the holder-plates, are exactly alined with these. The pricking and driving reciprocation of the plungers 160 is continuous, the actuating mechanism being so timed that while the turret is in rotation, the plungers are both elevated, and are not lowered sufficiently for the awls and drivers to enter the templet-openings until the turret has been locked. To aid in retaining the die 66, which is at the pricking station, against the upward pull upon the work when the awls are withdrawn, a contact member, in the form of a screw 172, is threaded into the frame above the outer extremity of the plate. This is so adjusted, by turning it and locking it in position by a nut 174, that it lies just above the path of the upper surface of the dies as they enter and leave the station, yet prevents, by its contact, upward displacement of the dies when the awls rise from the work.

Figure 4:
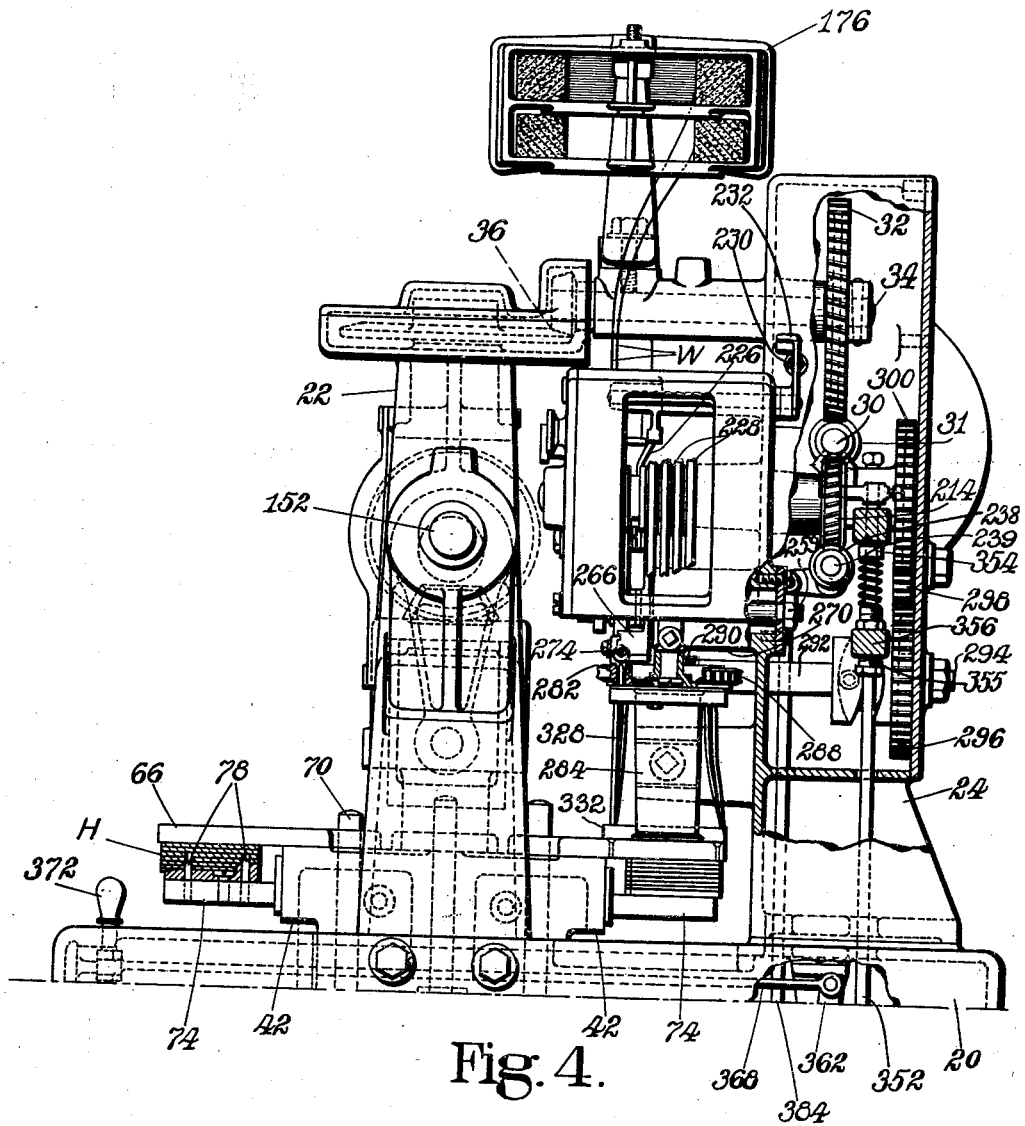
Figs. 4 and 5 are similar views taken from the right of Figs. 2 and 3, respectively.

The slug-forming and delivering mechanism at station C is carried by the frame-portion 24. A plurality of these slugs are produced simultaneously, in the present instance in multiples of two. Two coils of wire W, having its cross-section corresponding to that of a completed slug, are mounted in a holder 176 secured at the top of the frame-portion. From these coils, the wire is led down between opposite feed-rolls 178 and 180 (Figs. 8 and 9). The roll 178 is rotatable idly about a spindle 182 between divided portions of an arm 184 pivoted at 186 upon the frame. Between a connecting web of the arm 184 and the frame is interposed a spring 188, bearing at its outer end against a flange upon a screw 190 threaded into the frame. This arrangement permits the roll 178 to be forced yieldably toward the companion roll, and the pressure it exerts upon the wire to be varied. The roll 180 furnishes the active feeding agency, and is turned about a spindle 192 fixed at the forward portion of the frame-section 24. Fast upon this roll 180 is a ratchet-wheel 194, with which co-operate opposite pawls 196, 196 carried upon arms 198, 198 turning about the hub of the ratchet-wheel (Fig. 18). Springs 199 hold these pawls in normal engagement with the ratchet-wheel. To the lower arm 198 is pivoted a link 200, which is joined by a slot-and-screw connection 202, permitting its stroke to be adjusted, to a lever 204 fulcrumed at 206 upon the frame. The lever 204 has a projection entering a cam-groove 208 in a wheel 210 fixed upon a shaft 212 extending from front to rear of the frame-portion 24. Secured to the shaft 212 is a worm-wheel or spiral gear 214 meshing with the worm 31 of the motor-driven sleeve 29 (Figs. 4 and 8). The cam-groove 208 is so designed that its opposite portions $m$ and $n$ swing the pawls back and forth across the ratchet-teeth alternately in an active or feeding stroke and an idle stroke, the wires first being advanced a predetermined extent by the pawls, and said pawls then retreating for a fresh feeding stroke.

To change the feed, so that the length of wire advanced and the slugs produced may be varied, there is arranged to oscillate about the hub of the pawl-carrying arms a member having opposite contact-arms 216, 216 (Figs. 9 and 18). These members may be either turned to positions at which they are out of the path of the pawls and have no effect upon them, or may be advanced for engagement with said pawls, to lift them from the ratchet-wheel, thus nullifying their action during a portion or the whole of their strokes. Formed with the contact-arms is an actuating arm 218, connected by a link 220 to an arm 222 (Fig. 8) secured to a shaft 224 journaled in an extension of the frame-portion 24. Fixed to the shaft is a contact-arm 226, drawn against a cam-disk 228 by a spring 230, connecting the frame to a third arm 232 secured to the shaft. This disk 228 is preferably one of a series (Fig. 12) which surround a sleeve 234 splined upon a horizontal shaft 235 in the frame-extension. The shaft is rotated from the worm-wheel 214 through a worm or spiral gear 236 (Figs. 3 and 9) secured upon a transverse shaft 237 and joined by worm-gearing 238 to the shaft 235. The disks 228 are held against turning upon the sleeve by a collar 239 threaded thereon and acting to force the disks against a flange 240 at the opposite end of the sleeve. By loosening this collar, the disks may be turned, to adjust their timing, and fixed in the correct position. Any one of the disks may be brought into co-operation with the arm 226 by sliding the sleeve 234 along the shaft. This may be accomplished by a rod 241 movable horizontally in the frame and having at its inner end a yoke 242 entering a groove between the flange 240 and an outer flange 244. The selected disk may be retained in operative position by a latch 246 pivoted upon the frame-extension and arranged to engage any one of a series of grooves 248 in the rod 241, these grooves corresponding in their spacing to that of the disks. The contours of the disks are such as to produce different forward or active movements of the pawls 196, and consequently different degrees of rotation or feeding effects of the roll 180, so the wires will be advanced to produce slugs of diverse lengths. Considering the form of disk appearing in Fig. 8, this has a peripheral portion $o$ extending angularly about a considerable arc of the disk, a second portion $p$ of relatively slight angular extent, and still another intermediate portion $q$. This arrangement is adapted to produce the desired number of relatively short slugs for driving about the curved edge of a heel, and a relatively longer pair for insertion at the corners of the breast. With the portion $o$ of the cam in engagement with the arm 226, the contact members 216 are so positioned that, during a part of their stroke, the pawls are raised from the ratchet-teeth by engagement of surfaces 250 upon their inner sides with the members, and are therefore ineffective. During the remainder of the stroke, a feed of wire occurs less than the maximum. The portion $p$ of the cam causes the withdrawal of the contact members 216, so that they either effect the pawls less, or permit them to act for their entire stroke, thus giving a greater or the maximum feed of wire. When the portion $q$ is engaged by the arm 226, the members 216 are so advanced beneath the pawls that they may be held out of engagement with the ratchet-wheels during their entire stroke, feed of the wires thus ceasing. This last-mentioned action is during the period of slug-delivery.

If the operator desires to separate the feed-rolls, as may be the case when the ends of the wires are to be introduce, a hand-lever 252 (Fig. 8), fulcrumed at the front of the frame-portion 24, may be swung upwardly, bringing a short vertical arm against a pin 254 projecting from the arm 184 of the roll 178. By this action, the roll is moved away from the active feeding roll 180, leaving ample space between their peripheries for the entrance of the wires.

From the bite of the feed-rolls, the wires pass through delivery-conduits extending vertically side by side through a member 256 (Figs. 8, 9 and 17) secured upon the forward end of a horizontal spindle 258 attached at 259 (Fig. 4) to the frame-portion 24. The conduits terminate in delivery-nozzles 260 separably held in transverse ways in the member 256 by screws 262. For any cross-sectional form of wire to be utilized, nozzles with similarly formed openings are employed, these being readily changed by virtue of the character of their mounting.

The nozzles present the wires between co-operating cutting blades 264, 264 (Figs. 8 and 9). These blades, the edges of which meet beneath the nozzle-openings, are fixed in ways in the lower extremities of carrier-levers 266, 266. Outwardly projecting hubs 268 of these levers (Fig. 17), having their exteriors semi-cylindrical (Fig. 9), bear in a horizontally perforated boss 270 upon the frame-portion 24, through which boss the spindle 258 extends. The inner surfaces of the hubs are curved to fit and have a bearing upon this spindle. The cutting blades are clamped by side plates 272 secured to the lever, and may be accurately adjusted by screws 274 contacting with their outer ends. To oscillate the levers 266, they have lateral projections from their upper extremities entering, respectively, cam-grooves 276 and 278 in the disk 210. These cam-grooves so actuate the blades that they meet after the feeding movement of the roll 180 and sever the lower ends of the two advanced wires to form the slugs.

When the wires are fed by the rolls prior to the severing of the slugs, their extremities enter or are alined with one of a series of pairs of receiving openings 280 in a rotatable disk 282 of slug-distributing mechanism (Figs. 8, 9 and 13). This disk is shown as stepped upon a holder-frame 284 secured at one side to a bracket 286 projecting forwardly from the frame-portion 24. To successively aline pairs of openings 280 with the nozzles 260 to receive the slugs as they are cut, the disk 282 has upon its periphery a worm-wheel 288 engaged by a worm 290 formed upon a sleeve 292 rotatable about and movable longitudinally of a spindle 294 (Fig. 4) projecting horizontally from the frame-portion 24. Here shown as a part of the sleeve 292 is a gear 296, connected through an idler pinion 298 with a gear 300 rotatable by the shaft 212. While the sleeve 292 rotates continuously in the operation of the machine, its action is modified to produce alternate periods of rotation and rest of the distributing-disk in the same manner as control of the turret is effected. Formed with the gear 296 is a cam-groove 302, and entering this groove is an anti-friction roll carried by a projection 304 fixed to the frame. The form of this groove is generally the same as that of the groove 58 controlling the turret, it being of the same pitch as the worm 290 in one portion, and of a greater pitch at another. By these portions, the distributing-disk is first allowed to remain at rest, to receive a pair of slugs cut by the blades 264, and then to be advanced, to present the next pair of openings 280 to the nozzles 260, to receive the succeeding pair of slugs.

The slugs deposited in the openings 280 of the disk are retained until a complete load has accumulated, by a shutter-plate 306 rotatable about the axis of the disk and limited in its movement by pins 308 passing through arcuate slots 310 in the disk. In the shutter-plate, lying along the same circular lines as do the two series of openings 280, are openings 312, which are normally maintained in positions between the disk-openings by a spring 314 extending between pins projecting from the disk and plate, the latter pin passing through a slot 316 in the disk. Pivoted upon the top of the holder 284 adjacent to the edge of the distributing disk and shutter is a detent 318, lying normally clear of a projection 322 upon the periphery of the shutter. The disk is provided with a cam-projection 324, which, in the rotation of said disk, moves beneath a tail 326 from the detent, acting to rock the opposite end of said detent into the path of the projection 322. Consequently, when the disk has completed its rotation and received its load of slugs, the action of the cam-projection upon the detent causes the latter to engage the shutter-projection 322, holding the shutter against the tension of the spring 314, and bringing the openings 312 into alinement with the openings 280. The slugs are thus released, and fall through flexible tubes 328 mounted in the holder 284. The tubes terminate in openings 330 in a foot-plate 332, these openings being arranged in accordance with the same slugging design as that of the dies 66. The pairs of tubes receiving the simultaneously formed slugs lead to similarly located points at opposite sides of the foot-plate. Thus the longer slugs when driven, will be symmetrically positioned, as at the breast-corners of the heel. In the stopped or operating position of the turret, the openings of the templet at station C are alined with the openings in the foot-plate, this occurring at the time of actuation of the shutter.

Figure 5:
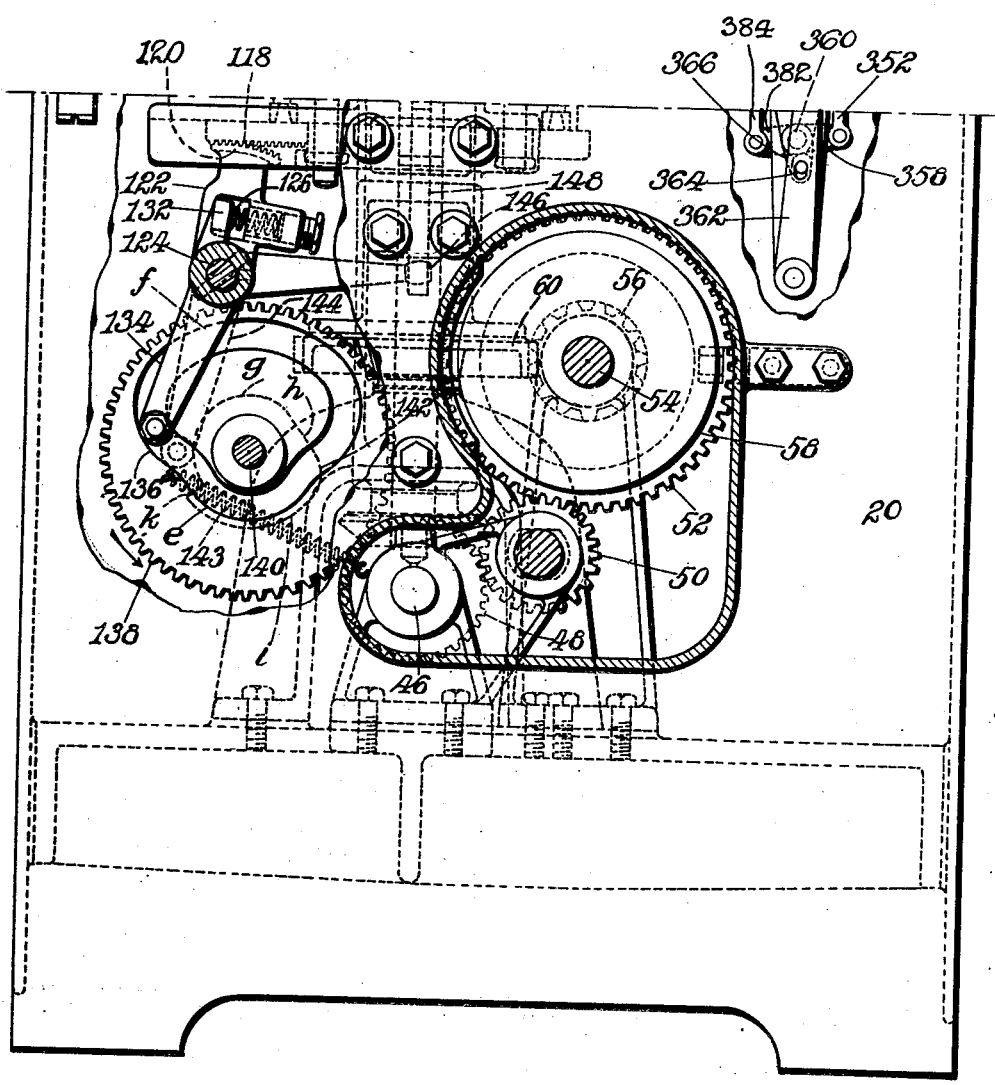

After the machine has once been started by engagement of the clutch mechanism M, it continues uninterrupted only long enough to rotate the turret through substantially 90 degrees, so that the clamping device is moved from one operating station to the next, unless control is exercised by the operator to cause continuance of its movement. The clutch includes two conical sections 340 and 342 (Fig. 8), the latter being situated within the former, having tapering surfaces, which are forced into engagement by a spring 344 surrounding a flanged sleeve 346 about the spindle 30. The flanged end of the sleeve bears against the head of clutch-section 340 fixed to the shaft of the motor 28, while the opposite end of the spring contacts with the inner face of the hub of section 342 carried by the sleeve 29. At the inner extremity of the sleeve (Figs. 8, 14 and 19) is a cam-surface 348, with which co-operates a yoke or contact member 350 carried upon the upper end of a vertical rod 352 (Fig. 4). Surrounding the rod 352 is a spring 354 interposed between a collar fixed to the rod and a sleeve 355 guiding the rod and threaded into a bracket 356 secured to the frame section 24. This spring, adjusted as to expansive force by the position of the sleeve 355, exerts a constant tendency to raise the yoke into contact with the cam-surface 348. When thus elevated, the cam, riding over the adjacent face of the yoke, forces the sleeve 29 to the left, as viewed in Fig. 14, to separate the clutch-sections and stop the operation of the machine. The rod 352 is connected to an arm 358 fixed upon a shaft 360 arranged to turn in the upper part of the base 20 (Figs. 5 and 6). Fulcrumed below one extremity of the shaft 360 is a substantially vertical lever 362 joined by a slot-and-pin connection 364 to a short arm 366 depending from the shaft 360. A generally horizontal rod 368 unites the upper extremity of the lever 362 to a lever 370 fulcrumed beneath the upper surface of the base at the front of the machine. Projecting upwardly from the juncture of the rod 368 and lever 370, through a slot in the base, is a handle 372, which may be grasped by the operator to prevent the elevation of the yoke 350 by the spring 354. The end of the lever 370 opposite the handle has co-operating with it a latch 374 pivoted beneath the top of the base, and drawn by a spring 376 into retaining engagement with the lever. The tail 378 of this latch lies in the path of projecting members 380 secured to the outer edges of the respective heel-supporting plates 74 (Fig. 10). After a clamping device has left the entering station A, at which time it should have received its heel ready for the operation upon it at the pricking station B, if the operator has supplied the heel and sees that it is properly positioned for pricking, he grasps the handle 372 and holds the yoke 350 against rising. As the clamping device travels on, its projection 380 will strike the latch, freeing the lever 370, but the retention by the operator of the handle 372 against movement prevents any action as a result of this. Suppose, however, the operator, in the time available, has been unable to place the heel correctly upon the pins 78, or has not had time to withdraw his hand from the clamping device. The lever 370, unrestrained, will therefore, by engagement of the latch by the projection 380, be released before the spindle 70 has passed off the lower surface $d$ of the cam 84. As a result of this, before the plate 74 can rise toward the die 66 to clamp the heel, the spring 354 raises the yoke 350. Upon contact of the cam-surface 348 with this yoke in the rotation of the sleeve 29, the clutch-section 342 is shifted to the left along the spindle 30, disengaging the clutch and causing the machine to stop. As the member 350 rises to thus release the clutch mechanism, an arm 382 (Figs. 6 and 14) upon the opposite side of the shaft 360 from the arm 358 swings down, and, through a link 384, rocks a bell-crank-lever 386 (Fig. 15), fulcrumed at 388 upon the frame-portion 24. Connected to the upwardly extending arm of the lever by a double link 390 is a brake-shoe 392, pivoted at 394 upon the frame. Extending circumferentially of the hub of the clutch-section 342 is a generally V-shaped projection 396 entering a correspondingly shaped depression in the brake-shoe. By the connections to the shaft 360, the toggle formed by the upper arm of the bell-crank-lever and the link 390 is straightened at the same time the rod 352 is elevated. Consequently, as the yoke 350 acts to open the clutch, the brake-shoe is forced against the driven section, promptly stopping its rotation and the action of the entire machine.

To generally outline the operation of the apparatus, and considering that one of the four clamping devices which is approaching station A, it may be said that, with the spindle 70 of the clamping device, and consequently the supporting plate 74, depressed by the action of the surface $d$ of cam 84, the device is ready to receive between its sections a heel to be slugged. The operator applies a heel H to the plate, with its openings $h$ upon the plate-pins 78, this exactly positioning the heel for all the operations upon it. After the arrest of movement, for the time predetermined by the form of the cam-slot 58, the rotation of the turret is resumed, and if the operator has placed the heel as it should be, he holds the stopping mechanism out of action by means of the handle 372. If he has failed, the latch 374 is tripped, causing the intermediate connections to raise the yoke 350 and disengage the clutch M, the auxiliary connections applying the brake 392. The operator may thereupon do whatever is necessary to prepare the heel for the continued action, and again start the machine by drawing the handle 372 outwardly, allowing the latch 374 to retain it, so that the clutch-sections may be engaged by the spring 344. When the clamping device reaches the pricking station B, rotation of the turret stops and the ram 104 is raised by the cam-groove 136, so the supporting plate 74 may have a solid backing. The plunger 160 at this station descends, the awls 168 passing through the openings in the templet 66 and penetrating the heel-substance. When the awls have been withdrawn from the heel, the upward stress upon the templet being resisted by the screw 172, the turret again moves on to carry the clamping device to station C. The openings in the templet are now alined with those in the foot-plate 332, and during the travel of the turret from one position to the next, the slug-making mechanism has been engaged in feeding the wires W by the rolls 178 and 180, under the control of the cam-groove 208, in lengths determined by the particular disk 228 which has been chosen by the operator, and delivering the ends of the wire through the nozzles 260 to the action of the cutters 264. These, oscillated by the cam-grooves 276 and 278, sever the ends of the wires in groups of two, which fall into the openings 280 of the distributing disk 282, and are supported upon the shutter 306. The receiving rotation of the disk having been completed and a full load of slugs delivered to it, detent 318 is moved by the cam-projection 324 to trip the shutter, bringing the openings 312 and 280 into alinement. Upon their release, the completed slugs fall through the tubes 328 and through the foot-plate-openings into the templet-openings 68, there engaging the punctures which the awls 168 have produced. The lower extremities of the tubes are so connected with the foot-plate-openings that the slugs of particular lengths will be delivered into those templet-openings which are alined with the desired points about the margin of the heel. The succeeding movement of the turret brings the clamping device to station D. Here, the descent of the drivers 170, after the turret has stopped and the ram 104 raised, forces the slugs into the pricked openings, to complete the slugging operation. The drivers having risen above the die, the cycle is completed by the movement of the clamping device to station A. During this final travel, the cam 84, acting upon the spindle 70, lowers the supporting plate 74, and as this occurs, the cam 98 elevates the yoke 86, the fingers 90 of which lift the heel from the pins 78. It is then carried against the finger 100 and swept from the clamping device, falling into a receptacle in the base of the machine. Upon each forward step to the turret, operations at all four stations occur simultaneously.

Having described my invention, what I claim as new and desire to secure by Letters Patent of the United States is:

1. In a machine for inserting fastenings in heels, a heel-conveyor, automatic means for moving and stopping the conveyor to present a heel successively to a heel-pricking position, a fastening-receiving position and a fastening-inserting position, and pricking mechanism, fastening-delivering mechanism and fastening-inserting mechanism situated at the respective positions.

2. In a machine for inserting fastenings in heels, a heel-conveyor, means for moving the conveyor to present a heel at a heel-receiving position and at a fastening-inserting position, inserting mechanism at the fastening-inserting position, and means arranged to remove the heel from the conveyor during its travel with said conveyor between the fastening-inserting and heel-receiving positions.

3. In a machine for inserting fastenings in heels, a heel-conveyor, means for moving the conveyor to present a heel at a heel-receiving position and at a fastening-inserting position, inserting mechanism at the fastening-inserting position, means arranged to remove the heel from the conveyor between the fastening-inserting and heel-receiving positions, and means arranged to permit the time at which conveyed heels reach the removing means to be varied.

4. In a machine for inserting fastenings in heels, a heel-conveyor, means for moving the conveyor to present a heel at a heel-receiving position and at a fastening-inserting position, inserting mechanism at the fastening-inserting position, and an ejecting member, lying in the path of the heel between the fastening-inserting and heel-receiving positions and being fixed against movement.

5. In a machine for inserting fastenings in heels, a heel-conveyor, means for moving the conveyor to present a heel at a heel-receiving position and at a fastening-inserting position, inserting mechanism at the fastening-inserting position, an ejecting member projecting into the path of the heel between the fastening-inserting and heel-receiving positions, and means arranged to permit the position of the ejecting member to be altered along the path of the heel.

6. In a machine for inserting fastenings in heels, a heel-conveyor, means for moving the conveyor to present a heel successively at a heel-pricking position, at a fastening-receiving position and at a fastening-inserting position, pricking mechanism, fastening-delivering mechanism and fastening-inserting mechanism situated at the respective positions, and an ejecting member acting upon the heel after it has left the fastening-inserting position.

7. In a machine for inserting fastenings in heels, a heel-conveyor, means for moving the conveyor to successive operating positions and for stopping said conveyor at such positions, fastening-forming mechanism at one of the positions, and means for operating the forming mechanism a plurality of times during the movement of the conveyor from one position to another and for delivering the thus-formed fastenings to a heel upon the conveyor when said conveyor is at rest.

8. In a machine for inserting fastenings in heels, a heel-conveyor, means for moving the conveyor to successive operating positions and for stopping said conveyor at such positions, fastening-forming mechanism at one of the positions, means for operating the forming mechanism a plurality of times during the movement of the conveyor from one position to another and for delivering the thus-formed fastenings to a heel upon the conveyor when said conveyor is at rest, and means arranged to vary such operations of the forming member.

9. In a machine for inserting fastenings in heels, a heel-conveyor, means for moving the conveyor to present a heel at a fastening-receiving position and at a fastening-inserting position, means at the receiving position for severing fastenings of different lengths from wire having a cross-section the same as that of the fastenings, and means at the inserting position for driving the thus-severed fastenings into a heel.

10. In a machine for inserting fastenings in heels, a heel-conveyor, means for moving the conveyor to present a heel at a fastening-receiving position and at a fastening-inserting position, means at the receiving position for severing fastenings of different lengths from wire having a cross-section the same as that of the fastenings, means arranged to control the lengths of the fastenings severed, and means at the inserting position for driving the thus-severed fastenings into a heel.

11. In a slugging machine, a rotatable turret provided with a plurality of heel-supporting devices, slug-delivering mechanism, slug-driving mechanism, and automatic means for stopping the rotation of the turret with different supporting devices simultaneously co-operating with the slug-delivering mechanism and slug-driving mechanism.

12. In a slugging machine, a rotatable turret provided with a plurality of heel-supporting devices, and slug-forming and delivering mechanism and slug-driving mechanism with which different supporting devices may simultaneously co-operate.

13. In a slugging machine, a rotatable turret provided with a plurality of heel-supporting devices, heel-pricking mechanism, slug-delivering mechanism, slug-driving mechanism, and automatic means for stopping the rotation of the turret with different supporting devices simultaneously co-operating with the pricking mechanism, slug-delivering mechanism and slug-driving mechanism.

14. In a slugging machine, a rotatable turret provided with a plurality of heel-supporting devices movable through slug-receiving and slug-inserting positions, cutting mechanism at the receiving position arranged to operate a plurality of times upon slug-wire during the travel of the series of supporting devices from one position to the next, and reciprocatory drivers acting upon the cut slugs at the inserting position.

15. In a slugging machine, a rotatable turret provided with a plurality of heel-supporting devices movable through slug-receiving and slug-inserting positions, cutting mechanism at the receiving position arranged to sever slugs of different lengths from wire having a cross-section the same as that of the slugs, and reciprocatory drivers acting upon the severed slugs at the inserting position.

16. In a slugging machine, a rotatable turret provided with a plurality of heel-supporting devices movable through slug-receiving and slug-inserting positions, cutting mechanism at the receiving position arranged to sever slugs of different lengths from wire and including feeding mechanism having a series of actuating members any one of which may be brought selectively into action, and reciprocatory drivers acting upon the severed slugs at the inserting position.

17. In a slugging machine, a rotatable turret provided with a plurality of heel-supporting devices movable through heel-receiving and slug-inserting positions, reciprocatory drivers acting upon the slugs at the inserting position, and an ejecting finger contacting with a slugged heel during the movement of a supporting device between the slug-inserting and heel-receiving positions.

18. In a slugging machine, a rotatable turret provided with a plurality of heel-supporting devices movable through heel-receiving and slug-inserting positions, reciprocatory drivers acting upon the slugs at the inserting position, an ejecting finger contacting with a slugged heel during the movement of a supporting device between the slug-inserting and heel-receiving positions, and means arranged to allow the finger to be adjusted along the path of the supporting devices.

19. In a machine for inserting fastenings in heels, a driving shaft, heel-supports revoluble at opposite sides of the shaft through pricking and fastening-inserting positions, plungers mounted to reciprocate at said positions, awls and drivers mounted upon the respective plungers, and actuating shafts for the plungers, said shafts being axially alined and geared to the driving shaft.

20. In a machine for inserting fastenings in heels, a driving shaft, heel-supports arranged to turn at opposite sides of the shaft, means for connecting the supports to the driving shaft to revolve them and to stop them simultaneously in pricking and fastening-inserting positions, plungers mounted to reciprocate at said positions, awls and drivers mounted upon the respective plungers, actuating shafts for the plungers axially alined at opposite sides of the driving shaft, and gearing connecting the driving and actuating shafts to rotate the latter continuously.

21. In a slugging machine, a frame, a vertical driving shaft rotatable therein, a turret provided with diametrically opposite heel-supports rotatable in the frame to move the supports horizontally, gearing connecting the driving shaft and turret and organized to stop the supports at pricking and slugging positions, plungers reciprocating in the frame at such pricking and slugging positions, awls and drivers mounted upon the respective plungers, alined actuating shafts extending horizontally at opposite sides of the driving shaft, connections between the actuating shafts and plungers, and gearing arranged to rotate the actuating shafts continuously from the driving shaft.

22. In a machine for inserting fastenings in heels, a conveyor arranged to present a heel at a plurality of operating stations, said conveyor being provided with a positioning surface arranged to co-operate with a corresponding surface formed within the periphery of a heel, and a plurality of fastening-inserting members acting upon the positioned heel at one of the stations.

23. In a machine for inserting fastenings in heels, a conveyor arranged to present a heel at a plurality of operating stations, said conveyor being provided with a positioning surface arranged to co-operate with a corresponding surface formed within the periphery of a heel, means at one of the stations for delivering simultaneously a plurality of fastenings to the positioned heel, and means at another station for driving the fastenings into such positioned heel.

24. In a machine of the class described, a support provided with a positioning surface arranged to co-operate with a corresponding surface formed within the periphery of a heel, and a plurality of members acting simultaneously to produce holes in the thus-positioned heel.

25. In a machine of the class described, a support provided with a positioning surface arranged to co-operate with a corresponding surface formed within the periphery of a heel, a plurality of members acting to produce holes in the thus-positioned heel, and a plurality of members for inserting fastenings in said holes.

26. In a machine for inserting fastenings in heels, a conveyor arranged to present a heel at a plurality of operating stations, said conveyor being provided with a positioning surface arranged to co-operate with a corresponding surface formed within the periphery of a heel, a plurality of members acting at one station to produce holes in the thus-positioned heel, and a plurality of members at another station for inserting fastenings in said holes.

27. In a machine for inserting fastenings in heels, a conveyor arranged to present a heel at a plurality of operating stations, said conveyor being provided with a positioning surface arranged to co-operate with a corresponding surface formed within the periphery of a heel, a plurality of members acting at one station to produce holes in the thus-positioned heel, means at another station for applying fastenings to said holes, and means at still another station for driving the fastenings into the holes.

28. In a slugging machine, a rotatable turret having a heel-support movable through a plurality of operating stations, said support being provided with a plurality of projections arranged to enter openings in a heel and to position such heel for operations upon it, and a plurality of reciprocatory drivers located at one of the stations and arranged to insert slugs in the heel thus positioned.

29. In a machine of the class described, a heel-support provided with a plurality of projections arranged to enter openings in a heel and to position such heel, and a plurality of awls co-operating with the support to prick a heel positioned by the projections.

30. In a machine of the class described, a heel-support provided with a plurality of projections arranged to enter openings in a heel and to position such heel, a plurality of awls co-operating with the support to prick a heel positioned by the projections, and a plurality of drivers arranged to insert fastenings in the pricked holes while the heel is positioned upon the support.

31. In a slugging machine, a rotatable turret having a heel-support movable through a plurality of operating stations, said support being provided with a plurality of projections arranged to enter openings in a heel and to position such heel for operations upon it, a plurality of awls co-operating with the support at one station to prick a heel positioned by the projections, and a plurality of drivers arranged at another station to insert slugs in the pricked holes.

32. In a slugging machine, a rotatable turret having a heel-support movable through a plurality of operating stations, said support being provided with a plurality of projections arranged to enter openings in a heel and to position such heel for operations upon it, a plurality of awls co-operating with the support at one station to prick a heel positioned by the projections, slug forming mechanism at another position delivering to the pricked holes, and a plurality of drivers at still another station for inserting the slugs.

33. In a machine for operating upon heels, a traveling clamp for heels comprising a movable plate provided with openings through which operations upon a clamped heel are performed, and a plate co-operating with that first named, such co-operating plate being movable with the companion plate and toward and from said companion plate in the travel of the clamp.

34. In a machine for operating upon heels, a traveling clamp for heels comprising a movable plate provided with openings through which operations upon a clamped heel are performed, a plate co-operating with that first named, such co-operating plate being movable with and toward and from its companion, and a spring arranged to cause the clamping movement of the plate.

35. In a machine for operating upon heels, a traveling clamp for heels comprising a movable plate provided with openings through which operations upon a clamped heel are performed, a plate co-operating with that first named, such co-operating plate being movable with the companion plate toward and from said companion plate in the travel of the clamp, and an abutment member arranged to resist separation of the plates.

36. In a machine for operating upon heels, a traveling clamp for heels comprising a movable plate provided with openings through which operations upon a clamped heel are performed, a plate co-operating with that first named, such co-operating plate being movable with and toward and from its companion, a spring arranged to cause the clamping movement of the plate, and an abutment member movable into engagement with the plate acted upon by the spring.

37. In a machine for operating upon heels, a conveyor, a templet separably secured to the conveyor and having openings, a pressure-plate movable upon the conveyor into and out of co-operation with the templet, and operating mechanism to which heels held between the plates are presented in the travel of the conveyor and acting upon said heels through the templet-openings.

38. In a machine for operating upon heels, a conveyor, a templet separably secured to the conveyor and having openings, a pressure-plate movable upon the conveyor into and out of co-operation with the templet, operating mechanism to which heels held between the plates are presented in the travel of the conveyor and acting upon said heels through the templet-openings, and an abutment member situated at an operating position and movable against the pressure-plate.

39. In a machine for operating upon heels, a conveyor, a plurality of heel-clamps mounted upon the conveyor and each including a templet separable from the conveyor and having openings and a pressure-plate, the templet and pressure-plate being relatively movable into and out of co-operation, and a plurality of operating mechanisms to which heels are simultaneously presented by the clamps and acting upon said heels through the templet-openings.

40. In a machine for operating upon heels, a conveyor, a heel-clamp movable by the conveyor to different operating positions and including a member provided with openings, operating means co-operating with the openings, means for actuating the clamp to engage a heel, and means acting upon the clamp to release the heel during its travel between operating positions.

41. In a machine for operating upon heels, a conveyor, a heel-clamp movable by the conveyor to different operating positions and including a templet, operating means acting through the templet, a spring for holding the clamp in engagement with the heel, and a cam acting upon the clamp to release the heel during its travel between operating positions.

42. In a machine for operating upon heels, operating mechanism, a clamp for presenting a heel to the operating mechanism, said clamp having sections movable relatively to permit the introduction of the heel, and an abutment movable into contact with a clamp-section and in the direction of its movement to resist the pressure of the operating mechanism.

43. In a machine for operating upon heels, operating mechanism, a clamp for presenting a heel to the operating mechanism, said clamp having sections movable relatively to permit the introduction of the heel, an abutment movable into contact with a clamp-section, and means arranged to vary the limit of movement of the abutment.

44. In a machine for operating upon heels, operating mechanism, a clamp for presenting a heel to the operating mechanism, said clamp having sections movable relatively to permit the introduction of the heel, an abutment movable into contact with a clamp-section, and means for moving the abutment arranged to limit its pressure upon the clamp.

45. In a machine for operating upon heels, operating mechanism, a clamp for presenting a heel to the operating mechanism, said clamp having sections movable relatively to permit the introduction of the heel, an abutment movable into contact with a clamp-section and in the direction of its movement to resist the pressure of the operating mechanism, and yieldable means for effecting such movement.

46. In a machine for operating upon heels, operating mechanism, a clamp for presenting a heel to the operating mechanism, said clamp having sections movable relatively to permit the introduction of the heel, an abutment co-operating with a clamp-section, a threaded mounting for the abutment, and means for turning the abutment in its mounting to bring it into contact with the clamp.

47. In a machine for operating upon heels, operating mechanism, a clamp for presenting a heel to the operating mechanism, said clamp having sections movable relatively to permit the introduction of the heel, an abutment co-operating with a clamp-section, a threaded mounting for the abutment, and means for turning the abutment in its mounting, said means including a lever having yieldably connected sections.

48. In a machine for operating upon heels, operating mechanism, a clamp for presenting a heel to the operating mechanism, said clamp having sections movable relatively to permit the introduction of the heel, an abutment co-operating with a clamp-section, a mounting for the abutment including a sleeve having threaded engagement with said abutment, means arranged to adjust the sleeve longitudinally of the abutment, and means for turning the abutment in its mounting to bring it into contact with the clamp.

49. In a machine for operating upon heels, a traveling clamp for heels comprising a movable plate provided with openings through which operations upon the clamped heels are performed, and a plate co-operating with that first named, such co-operating plate being movable with and toward its companion, one of the plates being provided with a positioning surface arranged to co-operate with a corresponding surface formed within the periphery of the heel and holding said heel in predetermined relation to the openings.

50. In a machine for operating upon heels, a traveling clamp for heels comprising a movable plate provided with openings through which operations upon the clamped heels are performed, and a plate co-operating with that first named, such co-operating plate being movable with and toward its companion, and one of said plates having heel-engaging projections.

51. In a machine for operating upon heels, a conveyor, a templet separably secured to the conveyor and having openings, a pressure-plate movable upon the conveyor into and out of co-operation with the templet and having heel-locating pins projecting toward the templet, and operating mechanism to which heels held between the plates are presented in the travel of the conveyor and acting upon said heels through the templet-openings.

52. In a machine for operating upon heels, a conveyor, a plurality of heel-clamps mounted upon the conveyor and each including a templet separable from the conveyor and having openings and a pressure-plate, the templet and pressure-plate being movable into and out of co-operation and there being heel-locating surfaces situated between their opposed clamping faces, and a plurality of operating mechanisms to which heels are simultaneously presented by the clamps and acting upon said heels through the templet-openings.

53. In a slugging machine, a turret, a clamp mounted upon the turret and including a templet provided with openings arranged in accordance with the slugging design and an opposite pressure member movable toward and from the templet, automatic means for rotating the turret to move the clamp and to stop its movement at different operating positions, and mechanism situated at an operating position for inserting slugs in a clamped heel through the templet-openings.

54. In a slugging machine, a turret, a clamp mounted upon the turret and including a templet provided with openings arranged in accordance with the slugging design and an opposite pressure member movable toward and from the templet, means for rotating the turret to move the clamp through different operating stations, reciprocatory awls at one station operating through the templet-openings to prick a clamped heel, supplying mechanism arranged at another station to deliver slugs to the templet-openings, and reciprocatory drivers at a third station movable through the openings to insert the supplied slugs in the heel.

55. In a slugging machine, a turret, a clamp mounted upon the turret and including a templet provided with openings arranged in accordance with the slugging design and an opposite pressure member movable toward and from the templet, means for rotating the turret to move the clamp through different operating stations, reciprocatory awls at one station operating through the templet-openings to prick a clamped heel, measuring and cutting mechanism arranged at another station to deliver slugs to the templet-openings, and reciprocatory drivers at a third station movable through the openings to insert the supplied slugs in the heel.

56. In a slugging machine, a turret, a clamp mounted upon the turret and including relatively movable plates arranged to engage opposite faces of a heel, means for rotating the turret through different operating stations, slug-inserting mechanism co-operating with one of the clamping plates at one of the stations, and an abutment at said station movable in the direction of clamping movement into engagement with the opposite clamping plate.

57. In a slugging machine, a turret, a clamp mounted upon the turret and including relatively movable plates arranged to engage opposite faces of a heel, means for rotating the turret through different operating stations, pricking mechanism co-operating with one of the clamping plates at one of the stations, slug-driving mechanism co-operating with said plate at another station, and an abutment situated at each of said stations and movable into engagement with the opposite clamping plate.

58. In a slugging machine, a turret, a clamp mounted upon the turret and including a templet provided with openings arranged in accordance with the slugging design and an opposite pressure-plate situated below and movable toward and from the templet, spaced pins projecting from the pressure-plate toward the templet and arranged to enter openings formed in a heel, means for rotating the turret to move the clamp through different operating stations and to stop the clamp at predetermined points at said stations, and means at the stations for inserting slugs in the clamped heel as positioned by the pins and by the stopping points of the turret.

59. In a slugging machine, a turret, a clamp mounted upon the turret and including a templet provided with openings arranged in accordance with the slugging design and an opposite pressure-plate situated below and movable toward and from the templet, spaced pins projecting from the pressure-plate toward the templet and arranged to enter openings formed in a heel, means for rotating the turret to move the clamp through different operating stations, and pricking mechanism, slug-supplying mechanism and driving mechanism located at said stations and acting upon the heel as positioned by the pins.

60. In a slugging machine, a turret, a clamp mounted upon the turret and including a templet provided with openings arranged in accordance with the slugging design and an opposite pressure-plate situated below and movable toward and from the templet, spaced pins projecting from the pressure-plate toward the templet and arranged to enter openings formed in a heel, means for rotating the turret to move the clamp through different operating stations, mechanism at the stations for operating upon the clamped heel, and an abutment at each station movable into engagement with the plate carrying the pins.

61. In a machine of the class described, a conveyor, a clamp mounted thereon and including opposite sections one of which is arranged to support the work, means for freeing the work from clamping engagement leaving it supported upon the section, and a supporting member movable into engagement with the work upon the supporting section.

62. In a machine of the class described, a conveyor, a clamp mounted thereon and including opposite sections one of which is arranged to support the work, means for freeing the work from clamping engagement leaving it supported upon the section, a supporting member movable into engagement with the work upon the supporting section to separate it therefrom, and means for removing the work from the supporting member.

63. In a machine of the class described, a conveyor, a clamp mounted thereon and including opposite sections one of which is arranged to support the work, a supporting member for the work independent of the clamp-section, and means made effective in the travel of the conveyor for freeing the work from clamping engagement and for moving the supporting member into engagement with the work.

64. In a machine of the class described, a conveyor, a clamp mounted thereon and including opposite sections one of which is arranged to support the work, a supporting member for the work independent of the clamp-section, and means made effective in the travel of the conveyor for freeing the work from clamping engagement, for moving the supporting member into engagement with the work and for removing said work from the supporting member.

65. In a machine for inserting fastenings in heels, a conveyor, a clamp mounted upon the conveyor for movement through a heel-receiving position and a fastening-inserting position, said clamp including upper and lower heel-engaging sections, means operating between the inserting and receiving positions for releasing a heel from clamping engagement, and means made effective between said positions for supporting the released heel.

66. In a machine for inserting fastenings in heels, a conveyor, a clamp mounted upon the conveyor for movement through a heel-receiving position and a fastening-inserting position, said clamp including upper and lower heel-engaging sections, means operating between the inserting and receiving positions for releasing a heel from clamping engagement, and a member movable to separate the heel from the lower section.

67. In a machine for inserting fastenings in heels, a conveyor, a clamp mounted upon the conveyor for movement through a heel-receiving position and a fastening-inserting position, said clamp including upper and lower heel-engaging sections, means operating between the inserting and receiving positions for releasing a heel from clamping engagement, and a member movable to separate the heel from the lower section, said member being arranged to thereafter support the heel.

68. In a machine for operating upon heels, a conveyor, a heel-support mounted upon the conveyor and provided with a projection arranged to enter an opening formed in a heel, and a member movable upon the conveyor into engagement with the heel to separate it from the projection.

69. In a machine for operating upon heels, a conveyor, a clamp mounted upon the conveyor and including opposite sections one of which is provided with projections arranged to enter openings formed in a heel, and means arranged to engage a heel during the movement of the conveyor and separate it from the projections.

70. In a machine for operating upon heels, a conveyor, a heel-support mounted upon the conveyor and provided with a projection arranged to enter an opening formed in a heel, a member movable into engagement with the heel to separate it from the projection and thereafter support it, and means for removing the heel from the supporting member.

71. In a slugging machine, a turret, a heel-clamp mounted thereon and including an upper and a lower plate relatively movable to engage and release a heel, means for rotating the turret to present a clamped heel at a slug-inserting position, means acting by virtue of the rotation of the turret to separate the plates, and a member movable in the movement of the turret to engage a supported heel released by the clamp.

72. In a slugging machine, a turret, a heel-clamp mounted thereon and including an upper and a lower plate relatively movable to engage and release a heel, means for rotating the turret to present a clamped heel at a slug-inserting position, a member movable to support a heel released by the clamp, and cams fixed relatively to the turret and arranged to separate the plates and to move the supporting member.

73. In a slugging machine, a turret, a heel-clamp mounted thereon and including an upper and a lower plate relatively movable to engage and release a heel, heel-engaging pins projecting from the lower plate toward the upper, means for rotating the turret to present a clamped heel at a slug-inserting position, a cam arranged to separate the plates to release a heel from clamping engagement, a member movable into contact with the released heel to lift it from the pins, and a cam for moving the member.

74. In a slugging machine, a turret, a heel-clamp mounted thereon and including an upper and a lower plate relatively movable to engage and release a heel, heel-engaging pins projecting from the lower plate toward the upper, means for separating the plates to release a heel from clamping engagement, a member movable into contact with the released heel to lift it from the pins and support it, and a finger fixed relatively to the turret and projecting into the path of the thus-supported heel.

75. In a machine for inserting fastenings in heels, a plurality of fastening-inserting members, means for cutting successive groups of fastenings from wire, and means for assembling the groups in definite relation to complete a load and for delivering said load to receive the action of the inserting members.

76. In a machine for inserting fastenings in heels, a plurality of fastening-inserting members, means for cutting successive groups of fastenings from wire having a cross-section the same as that of the fastenings, and means for assembling the groups in definite relation to complete a load and for delivering said load to receive the action of the inserting members.

77. In a machine for inserting fastenings in heels, a plurality of fastening-inserting members, means for cutting fastenings, means for feeding to the cutting means different lengths of wire having a cross-section the same as that of the fastenings, a plurality of members for actuating the feeding means, means arranged to move the actuating members and thereby make any one effective, and means for delivering the cut fastenings to receive the action of the inserting members.

78. In a machine for inserting fastenings in heels, heel-pricking mechanism, means for cutting successive groups of fastenings from wire having a cross-section the same as that of the fastenings, means for assembling the groups in definite relation to complete a load and for presenting said load to a pricked heel, and a plurality of members movable into contact with the fastenings to insert them in the openings pricked in the heel.

79. In a machine for inserting fastenings in heels, heel-pricking mechanism, means for cutting fastenings of different lengths from the wire having a cross-section the same as that of the fastenings, means for presenting the fastenings to a pricked heel, a plurality of members movable into contact with the fastenings to insert them in the openings pricked in the heel, and means for moving the heel between the pricking mechanism, presenting means and inserting members.

80. In a machine for inserting fastenings in heels, a plurality of members movable to insert fastenings in a heel, and means arranged to cut simultaneously a pair of fastenings, and means arranged to assemble successively the cut pairs and to deliver the respective nails of the pairs simultaneously at opposite sides of the heel to receive the action of the inserting members.

81. In a fastening-inserting machine, fastening-inserting mechanism, means arranged to feed simultaneously a plurality of wires, mechanism operating upon the wires to cut fastenings therefrom, a rotatable disk having a series of groups of openings, the openings of each group corresponding in number to the wires, means for controlling the delivery from the openings to the fastening-inserting mechanism, and means for rotating the disk to successively receive groups of cut fastenings.

82. In a slugging machine, a templet, a plurality of drivers co-operating therewith, cutters arranged to produce simultaneously a plurality of slugs from wires, and a rotatable distributing disk arranged to receive the groups of slugs from the cutters and deliver them to the templet.

83. In a slugging machine, a templet, a plurality of drivers co-operating therewith, cutters arranged to produce simultaneously a plurality of slugs from wires, a rotatable distributing disk arranged to receive the groups of slugs from the cutters and deliver them to the templet, a shutter co-operating with the disk to support the delivered slugs, and means acting in the rotation of the disk to release slugs from the shutter.

84. In a slugging machine, a templet, a plurality of drivers co-operating therewith, cutters arranged to produce simultaneously a plurality of slugs, mechanism for feeding wires to the cutters, cam mechanism arranged to vary the action of the feeding mechanism for different operations of the cutters, and a movable distributing member arranged to receive groups of slugs from the cutters and deliver them to the templet.

85. In a slugging machine, a templet, a plurality of drivers co-operating therewith, cutters arranged to produce simultaneously a plurality of slugs, mechanism for feeding wires to the cutters, a series of cams any one of which may be brought into operative relation with the feeding mechanism, and a movable distributing member arranged to receive groups of slugs from the cutters and deliver them to the templet.

86. In a slugging machine, a templet, a plurality of drivers co-operating therewith, cutters arranged to produce simultaneously pairs of slugs, a rotatable distributing disk having a series of pairs of openings to receive such pairs of slugs, and connections for delivering the slugs of such pairs to opposite sides of the templet.

87. In a machine for inserting fastenings in heels, fastening-inserting mechanism, wire-feeding mechanism, a conduit to which the wire is delivered by the feeding mechanism, a distributing member located in proximity to the conduit and having openings by which the wire is received and by which it is delivered to the inserting mechanism, and cutters operating between the conduit and distributing member.

88. In a machine for inserting fastenings in heels, fastening-inserting mechanism, wire-feeding mechanism, a stationary spindle, cutting mechanism including levers mounted to oscillate upon the spindle, a conduit carried by the spindle and arranged to direct fastenings to the cutting mechanism, and a distributing member having openings by which the cut fastenings are received for delivery to the inserting mechanism.

89. In a machine of the class described, operating mechanism, a conveyor arranged to advance work from a receiving position to the operating mechanism, driving mechanism, connections between the driving mechanism and conveyor, and means movable with the conveyor and arranged to act upon the connections.

90. In a machine of the class described, operating mechanism, a conveyor for presenting work to the operating mechanism, driving mechanism for the machine, means acting normally to disconnect the driving mechanism from the conveyor at predetermined times, and means for rendering the disconnecting means ineffective, its action being nullified in the movement of the conveyor.

91. In a machine of the class described, operating mechanism, a conveyor for presenting work to the operating mechanism, driving mechanism for the machine, brake mechanism associated with the machine, means movable by the driving mechanism for controlling said driving mechanism, means under the influence of the conveyor for controlling the driving mechanism and brake mechanism, and a member arranged for engagement by the operator for modifying such control.

92. In a machine of the class described, operating mechanism, a conveyor for presenting work to the operating mechanism, driving mechanism for the machine, means acting normally to disconnect the driving mechanism from the conveyor at predetermined times, means for rendering the disconnecting means ineffective, its action being nullified in the movement of the conveyor, and a member arranged for engagement by the operator to prevent such nullification.

93. In a machine of the class described, operating mechanism, driving mechanism for the machine including a clutch, means acting normally in the operation of the machine to disconnect the clutch, a latch arranged to engage the disconnecting means and retain it against movement to prevent its disconnecting action, and means acting in the operation of the machine for releasing the latch.

94. In a machine of the class described, operating mechanism, driving mechanism for the machine including a clutch, means acting normally in the operation of the machine to disconnect the clutch, a latch for preventing the action of the disconnecting means, means acting in the operation of the machine for releasing the latch, and a member arranged for engagement by the operator to retain the disconnecting means in position for control by the latch.

95. In a machine of the class described, operating mechanism, driving mechanism for the machine including a clutch, brake mechanism for the machine, means acting normally in the operation of the machine to disconnect the clutch and apply the brake mechanism, a latch for preventing the action of the disconnecting means, and means acting in the operation of the machine for releasing the latch.

96. In a machine of the class described, operating mechanism, a conveyor for presenting work to the operating mechanism, a motor, a driving shaft for the machine, a clutch connecting the motor and driving shaft, a cam rotatable by the driving shaft, a member normally acting upon the cam to disengage the clutch, and a latch arranged to hold the member out of engagement with the cam.

97. In a machine of the class described, operating mechanism, a conveyor for presenting work to the operating mechanism, a motor, a driving shaft for the machine, a clutch connecting the motor and driving shaft, a cam rotatable by the driving shaft, a member normally acting upon the cam to disengage the clutch, a latch arranged to hold the member out of engagement with the cam, and a member movable by the conveyor to disengage the latch.

98. In a slugging machine, a rotatable turret, a plurality of heel-supports carried by the turret and movable thereby to successive operating stations, operating mechanism at the stations, driving mechanism for the machine, means acting in the operation of the machine for disconnecting the driving mechanism from the machine and including a lever, a latch for the lever, and a member movable with each heel-support and arranged to disengage the latch.

99. In a slugging machine, a rotatable turret, a plurality of heel-supports carried by the turret and movable thereby to successive operating stations, at one of which heels are supplied to the supports, operating mechanism at a station, driving mechanism for the machine, means acting in the operation of the machine for disconnecting the driving mechanism from the machine and including a lever, a latch for the lever, and a member movable with each heel-support and arranged to disengage the latch, there being operator-controlled connections at the supplying station arranged to retain the lever in co-operation with the latch.

In testimony whereof I have signed my name to this specification.

EUGENE J. RAY.